US010834766B2

(12) United States Patent
Hong

(10) Patent No.: US 10,834,766 B2
(45) Date of Patent: Nov. 10, 2020

(54) UNMANNED VEHICLE CONTROLLING SYSTEM AND METHOD OF OPERATING SAME

(71) Applicant: Electronics and Telecommunications Research Institute, Daejeon (KR)

(72) Inventor: Tae Chui Hong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 79 days.

(21) Appl. No.: 16/137,122

(22) Filed: Sep. 20, 2018

(65) Prior Publication Data

US 2019/0223237 A1    Jul. 18, 2019

(30) Foreign Application Priority Data

Jan. 18, 2018  (KR) .................. 10-2018-0006587
Apr. 4, 2018   (KR) .................. 10-2018-0039362
Aug. 13, 2018  (KR) .................. 10-2018-0094306

(51) Int. Cl.
*H04W 76/14*     (2018.01)
*H04W 8/00*      (2009.01)
(Continued)

(52) U.S. Cl.
CPC .......... *H04W 76/14* (2018.02); *G05D 1/0022* (2013.01); *H04L 63/08* (2013.01); *H04W 4/70* (2018.02); *H04W 8/005* (2013.01); *H04W 48/16* (2013.01); *H04W 64/00* (2013.01); *H04W 76/11* (2018.02); *H04W 76/12* (2018.02);
(Continued)

(58) Field of Classification Search
None
See application file for complete search history.

(56) References Cited

U.S. PATENT DOCUMENTS 9,596,225 B2    3/2017  Kim et al.
9,955,409 B2 *  4/2018  Baek ............... H04W 48/16
(Continued)

FOREIGN PATENT DOCUMENTS

KR        101634585 B1    6/2016
KR     1020160115643 A   10/2016
(Continued)

*Primary Examiner* — Anh Ngoc M Nguyen
(74) *Attorney, Agent, or Firm* — William Park & Associates Ltd.

(57) ABSTRACT

Disclosed is a terminal controlling system and method for controlling multi-device. A method of operating a terminal controlling system according to the present disclosure includes: by a first terminal, detecting a second terminal and producing detection result information; by the first terminal, transmitting the detection result information to a first control device controlling the first terminal; by the first control device, making a request to a server device for information on the second terminal; by the first control device, making a request to a second control device controlling the second terminal for inter-terminal interworking, using the information on the second terminal received from the server device; by the first control device, receiving a response to the inter-terminal interworking request from the second control device; and by the first terminal, communicating with the second terminal based on the response received from the first control device.

14 Claims, 15 Drawing Sheets

(51) Int. Cl.
    *H04W 48/16*     (2009.01)
    *H04W 76/11*     (2018.01)
    *H04W 76/12*     (2018.01)
    *G05D 1/00*     (2006.01)
    *H04L 29/06*     (2006.01)
    *H04W 4/70*     (2018.01)
    *H04W 64/00*     (2009.01)
    *H04W 12/06*     (2009.01)
    *H04W 4/40*     (2018.01)
    *H04W 84/00*     (2009.01)
    *H04W 8/24*     (2009.01)

(52) U.S. Cl.
    CPC ............... *H04W 4/40* (2018.02); *H04W 8/24* (2013.01); *H04W 12/06* (2013.01); *H04W 84/005* (2013.01)

(56) References Cited

U.S. PATENT DOCUMENTS

| | | | |
|---|---|---|---|
| 2012/0184301 A1* | 7/2012 | Jovicic | G01S 5/0252 455/456.5 |
| 2017/0142766 A1 | 5/2017 | Kim | |
| 2017/0215220 A1 | 7/2017 | Kim et al. | |
| 2017/0221366 A1 | 8/2017 | An et al. | |
| 2018/0070242 A1* | 3/2018 | Damnjanovic | H04W 16/14 |

FOREIGN PATENT DOCUMENTS

| | | |
|---|---|---|
| KR | 1020170027116 A | 3/2017 |
| KR | 1020170088594 A | 8/2017 |
| KR | 1020170105379 A | 9/2017 |

* cited by examiner

[FIG. 1]
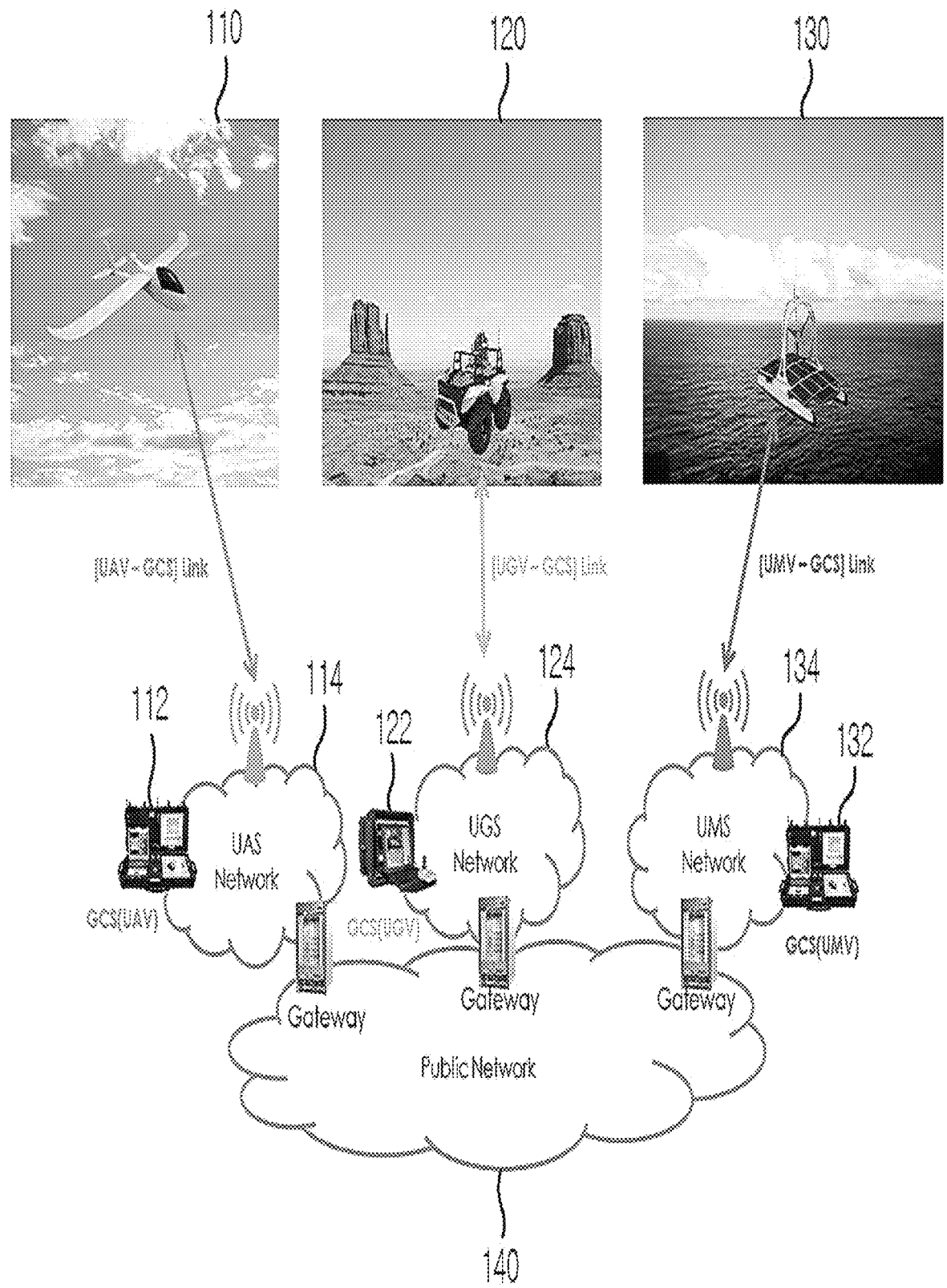

[FIG. 2]
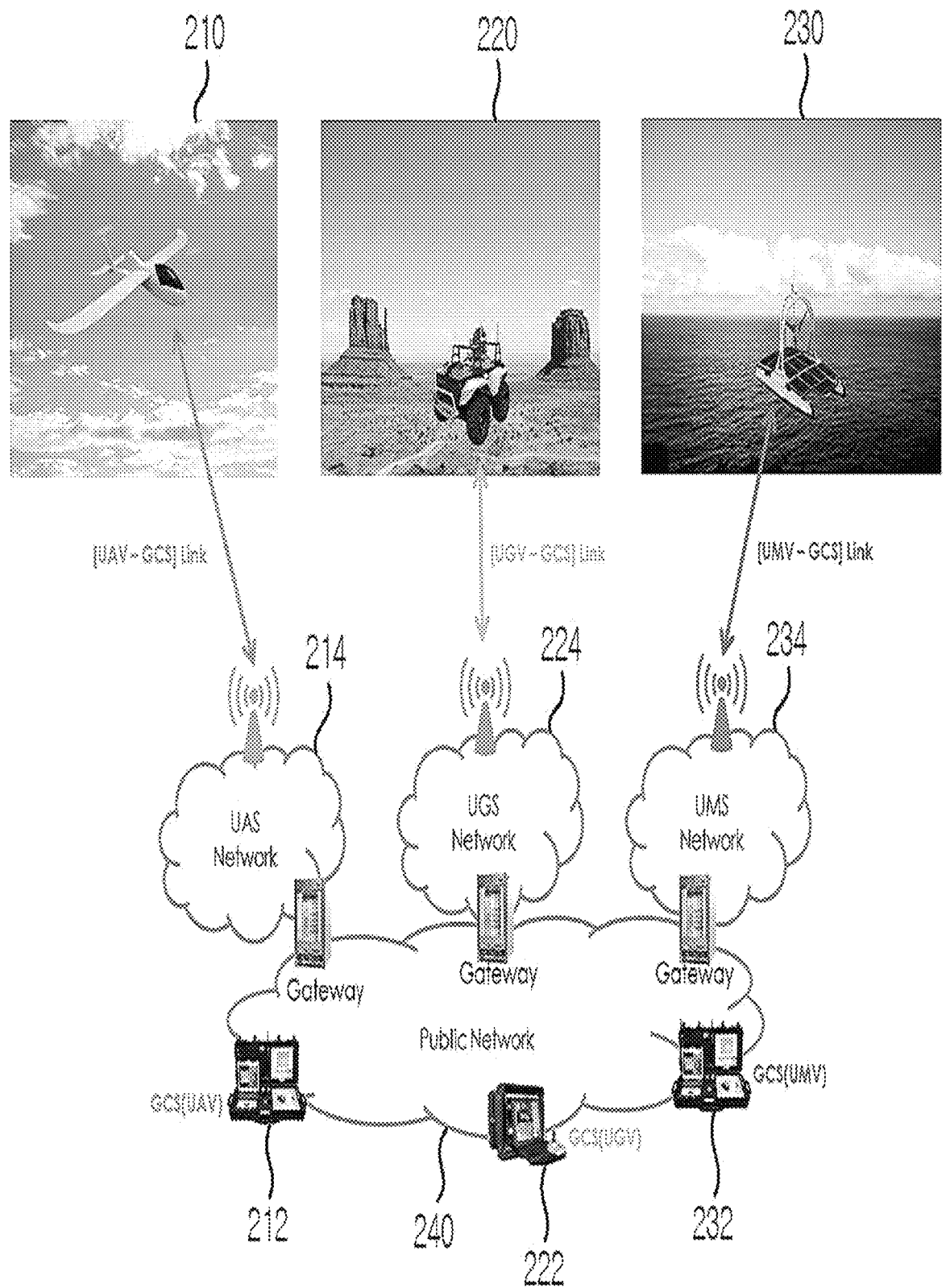

[FIG. 3]
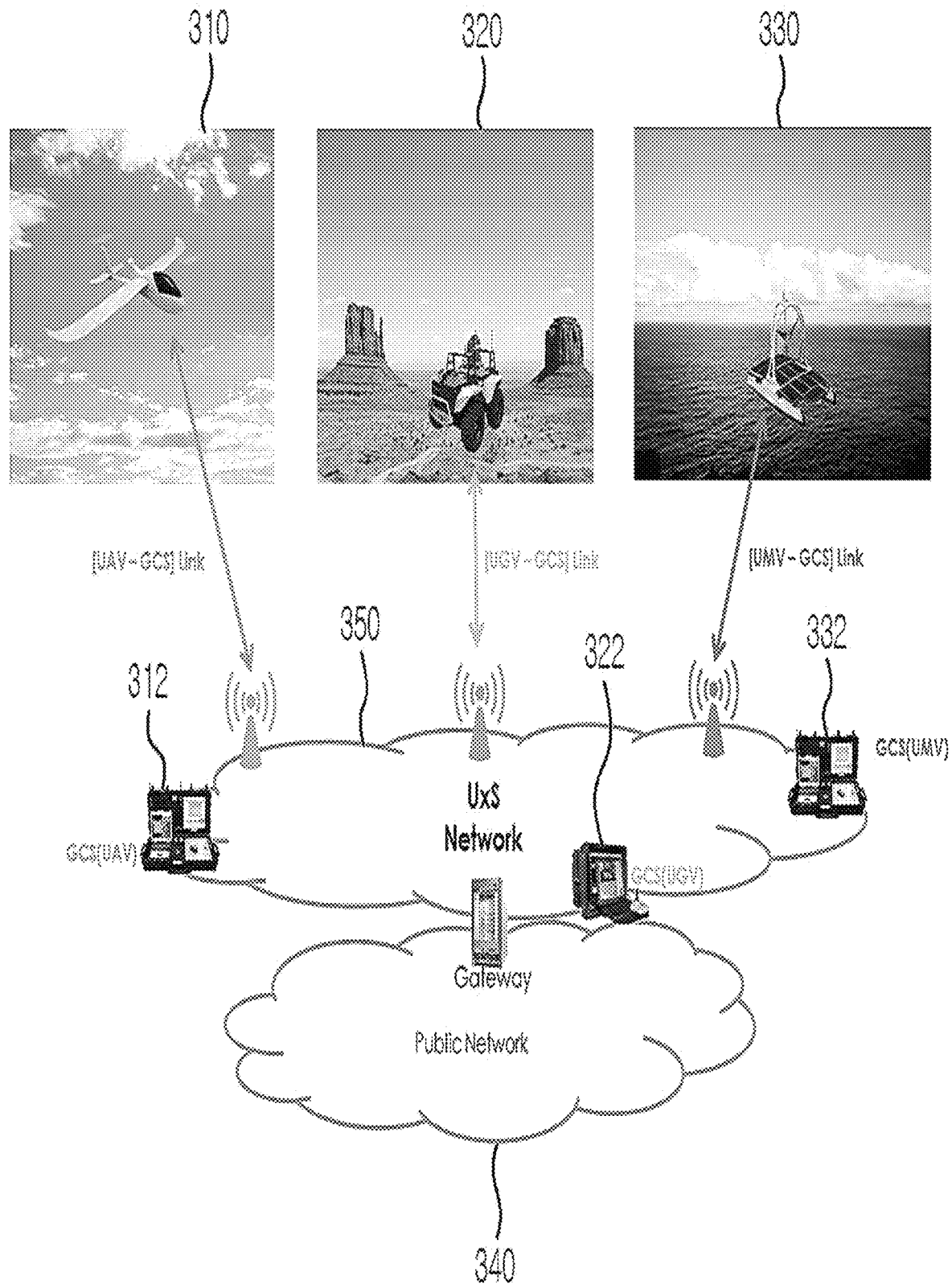

[FIG. 4]
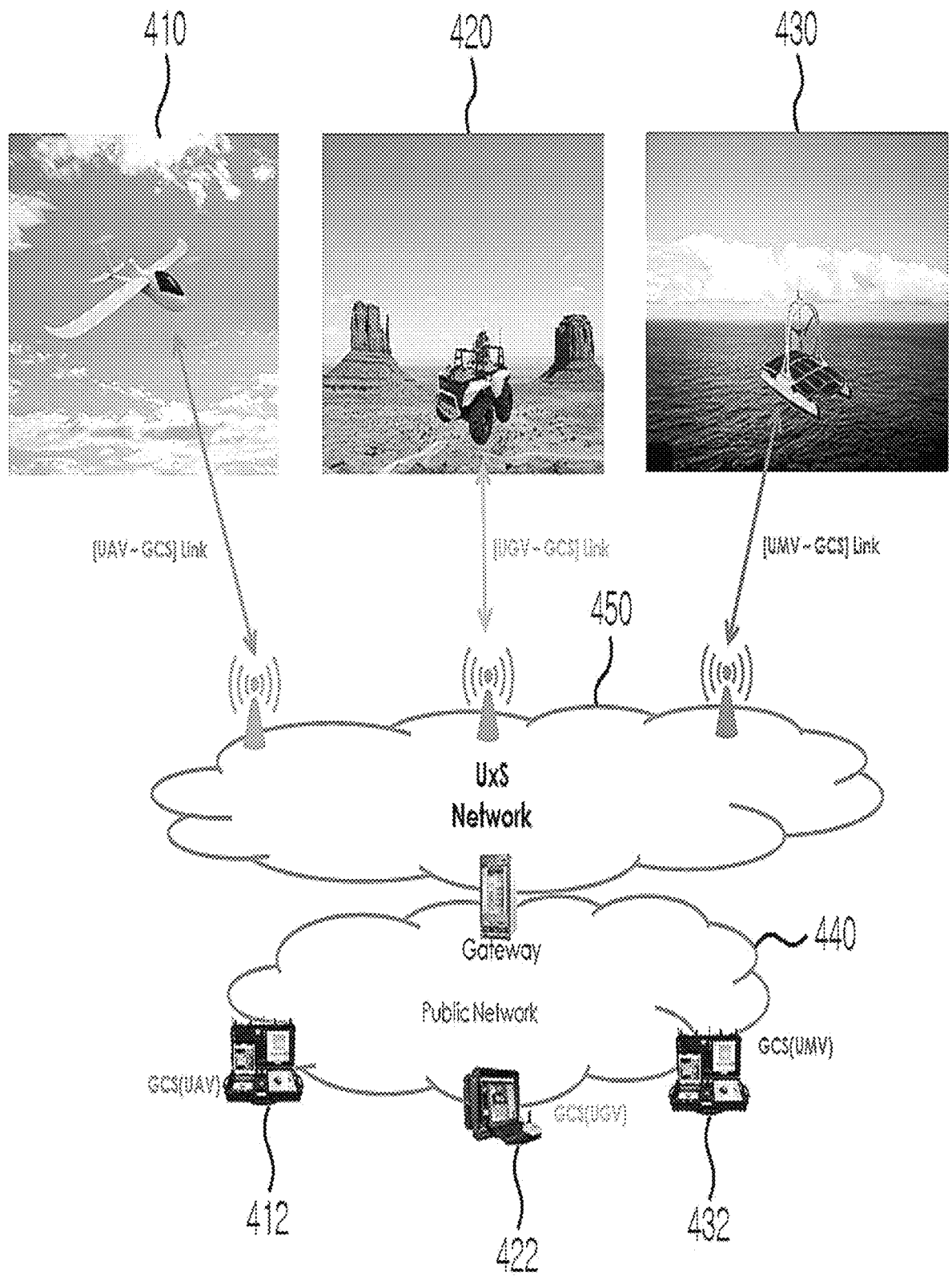

[FIG. 5]
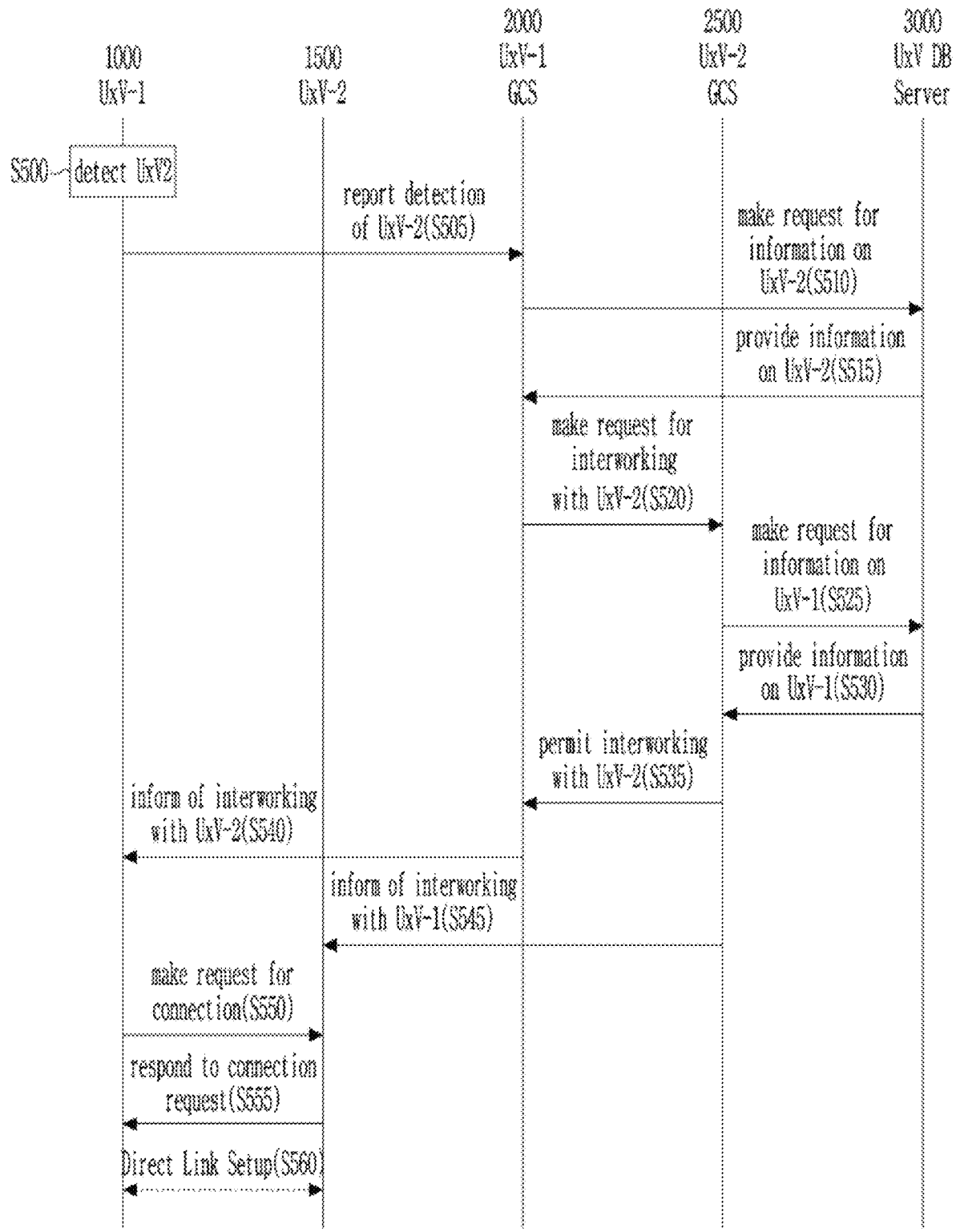

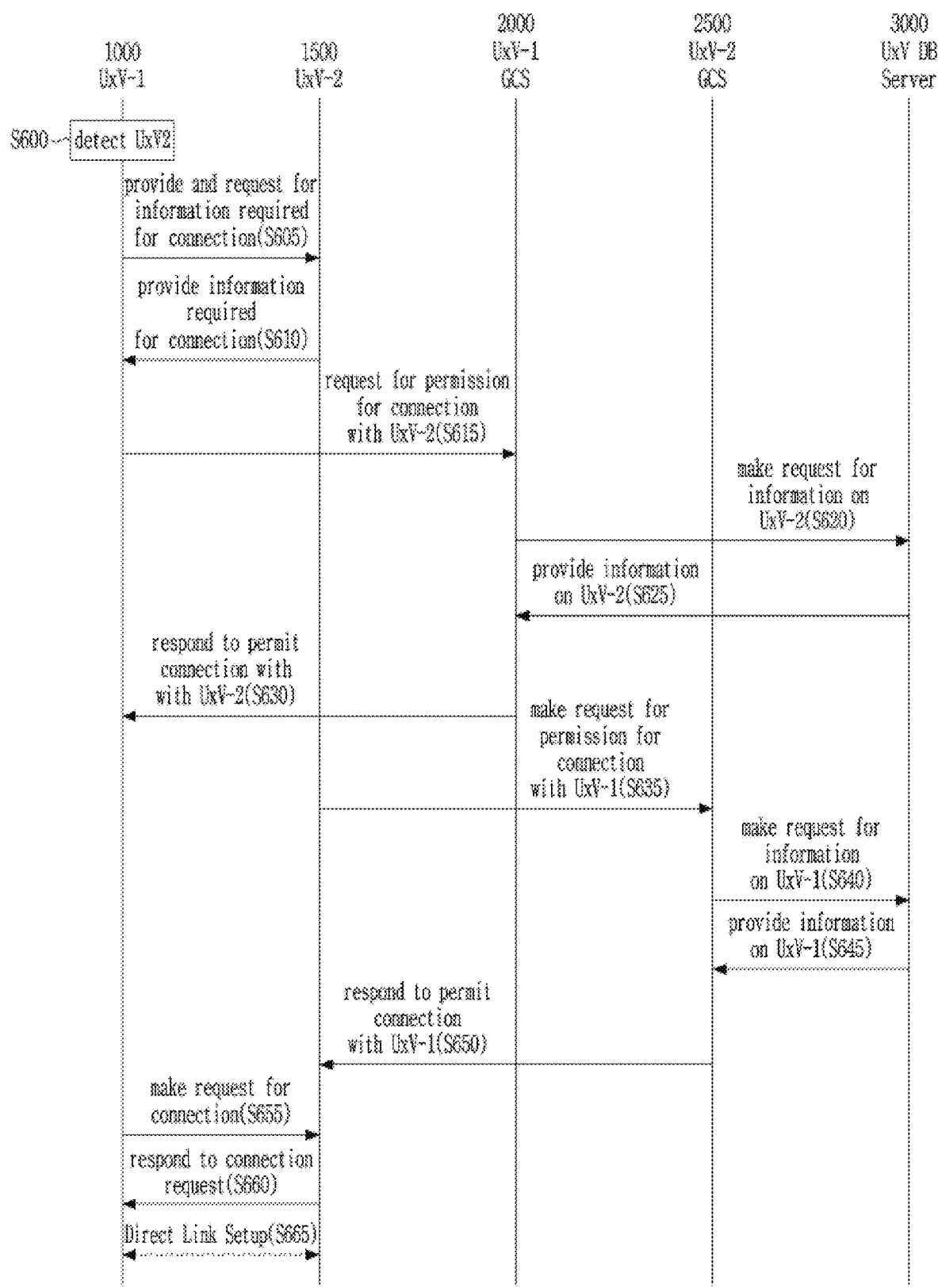
[FIG. 6]

[FIG. 7]
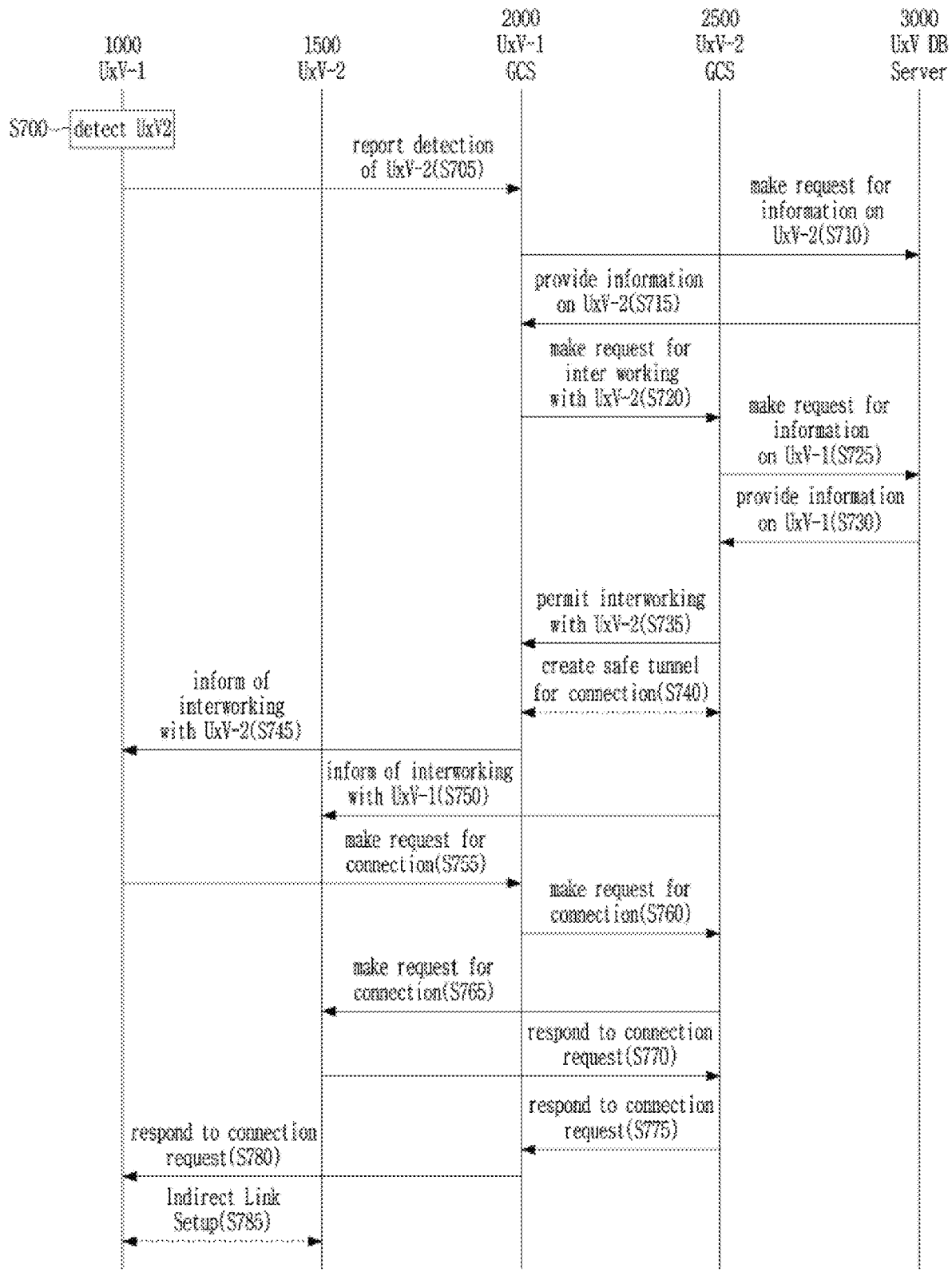

[FIG. 8]
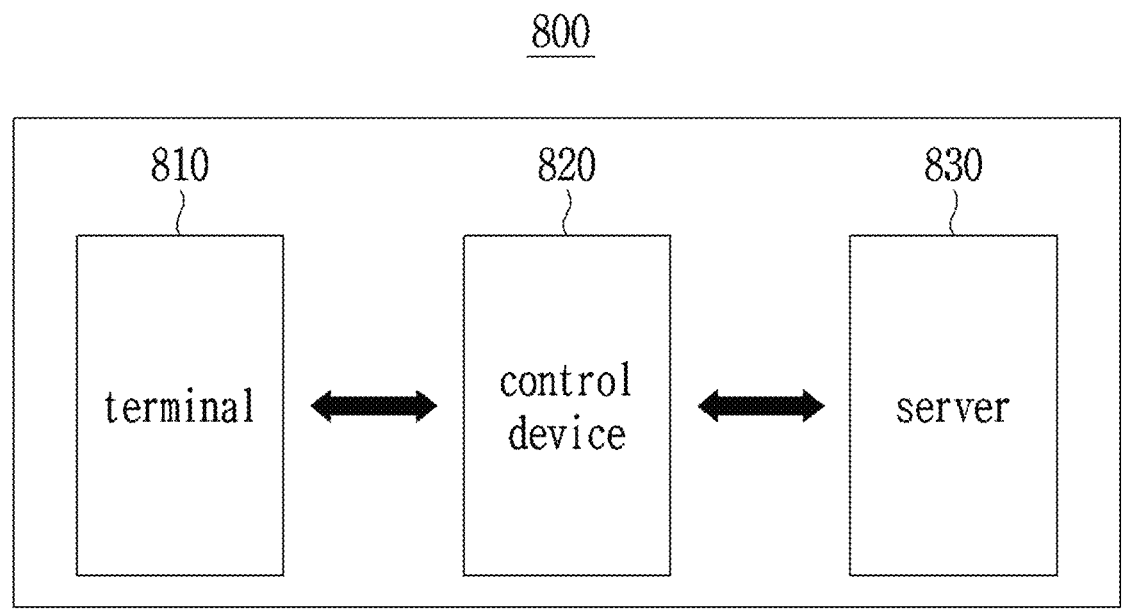

[FIG. 9]
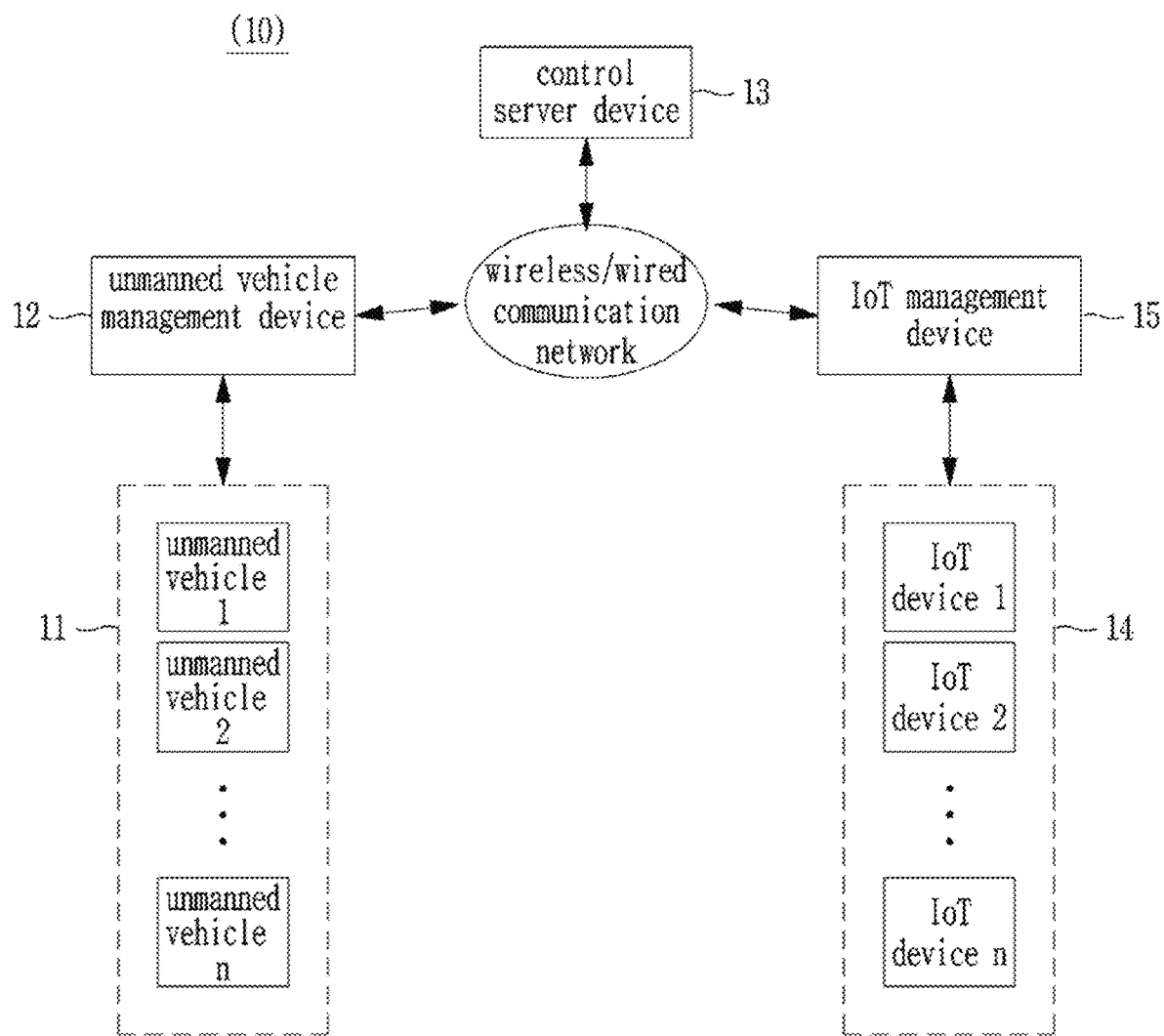

[FIG. 10]

| access level | mission that can be performed at a determined access level |
|---|---|
| 1 | authorized to collect basic IoT collection information corresponding to basic functions of IoT device |
| 2 | authorized to collect extended IoT collection information corresponding to extended functions of IoT device |
| 3 | authorized to control operation of IoT device with exceptions (being unable to turn off IoT device or to stop operation of IoT device) |
| 4 | authorized to control operation of IoT device without exception (being able to turn off IoT device or stop operation of IoT device) |
| ..... | ....... |

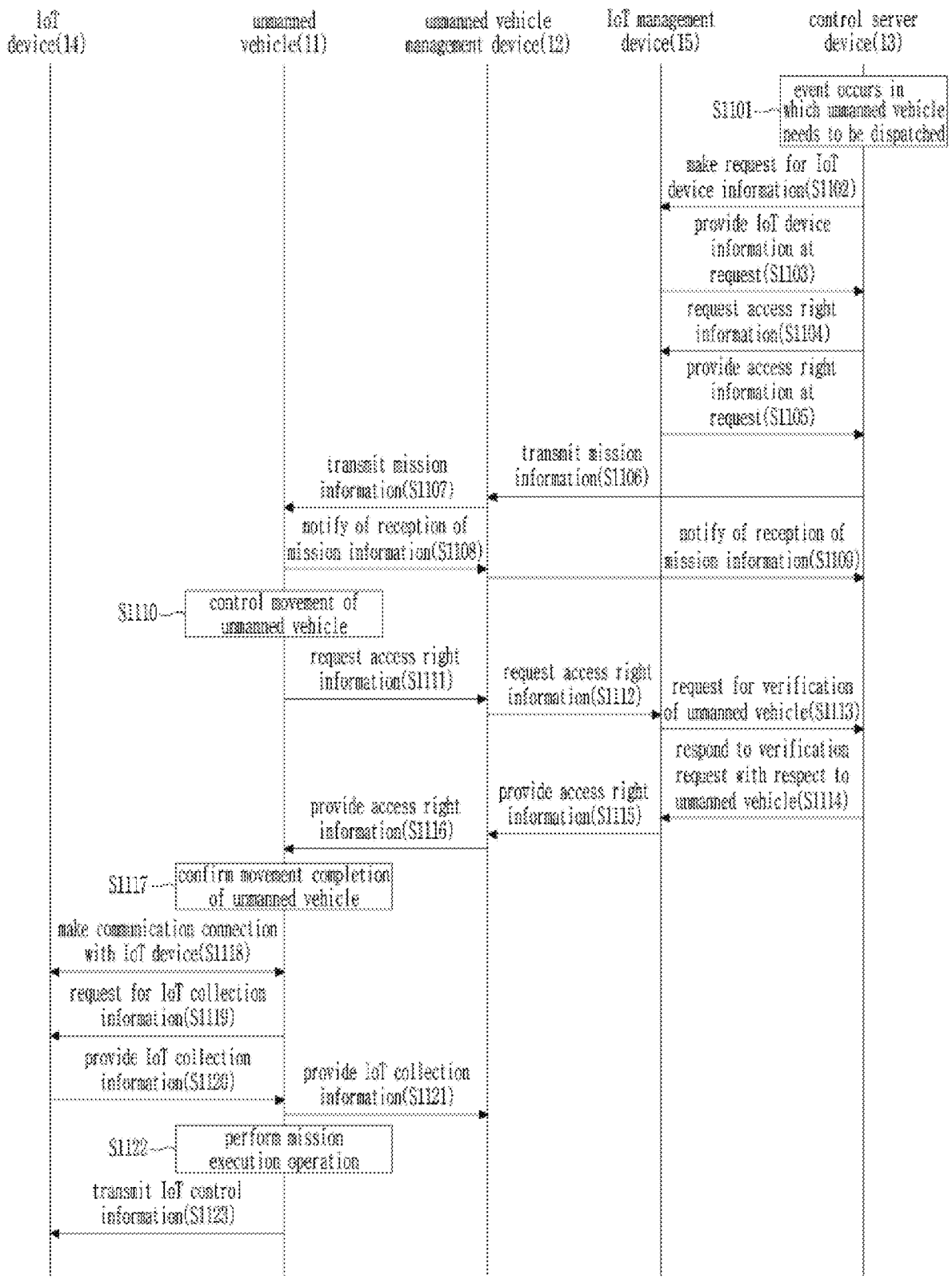

[FIG. 12]
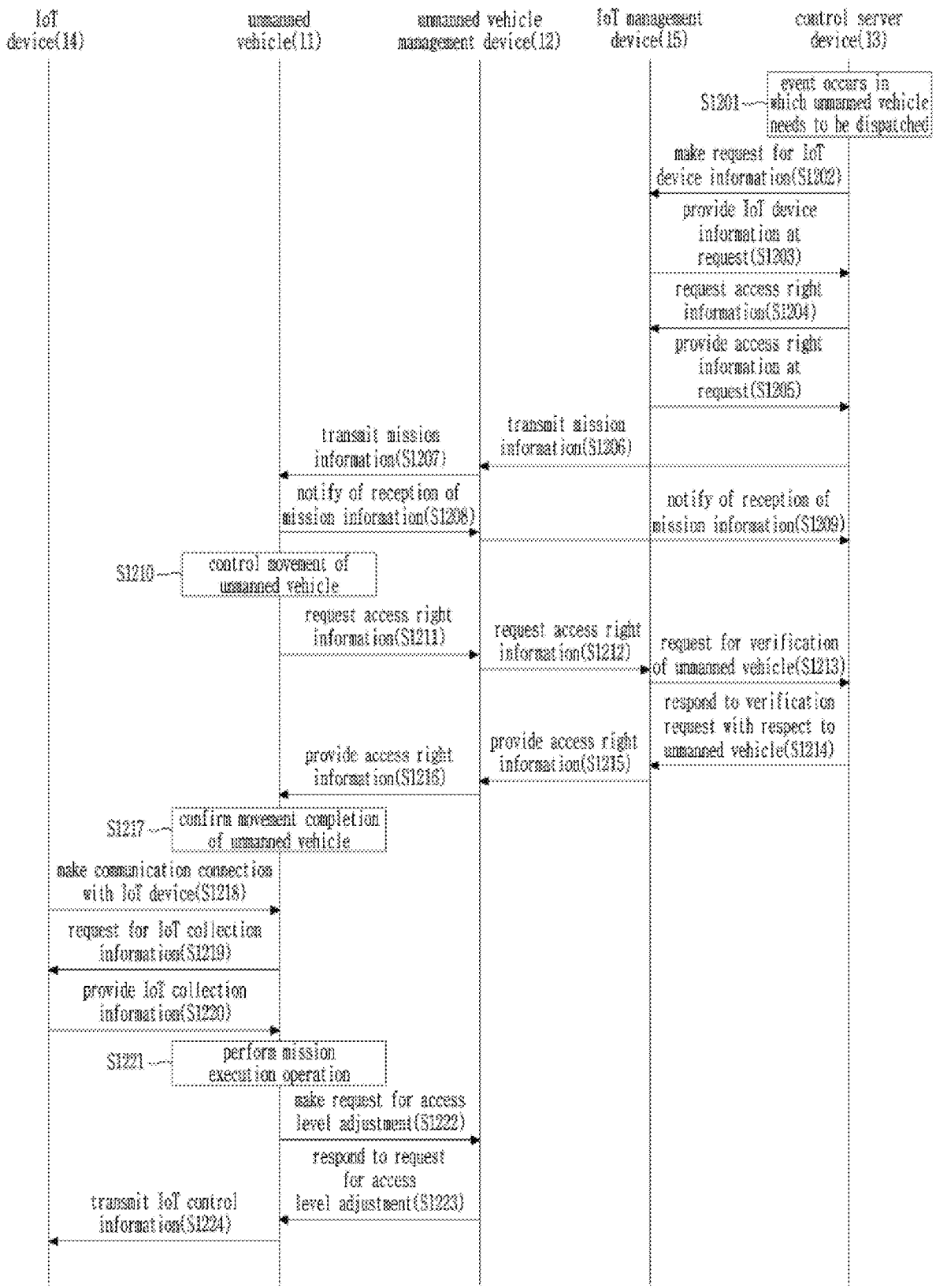

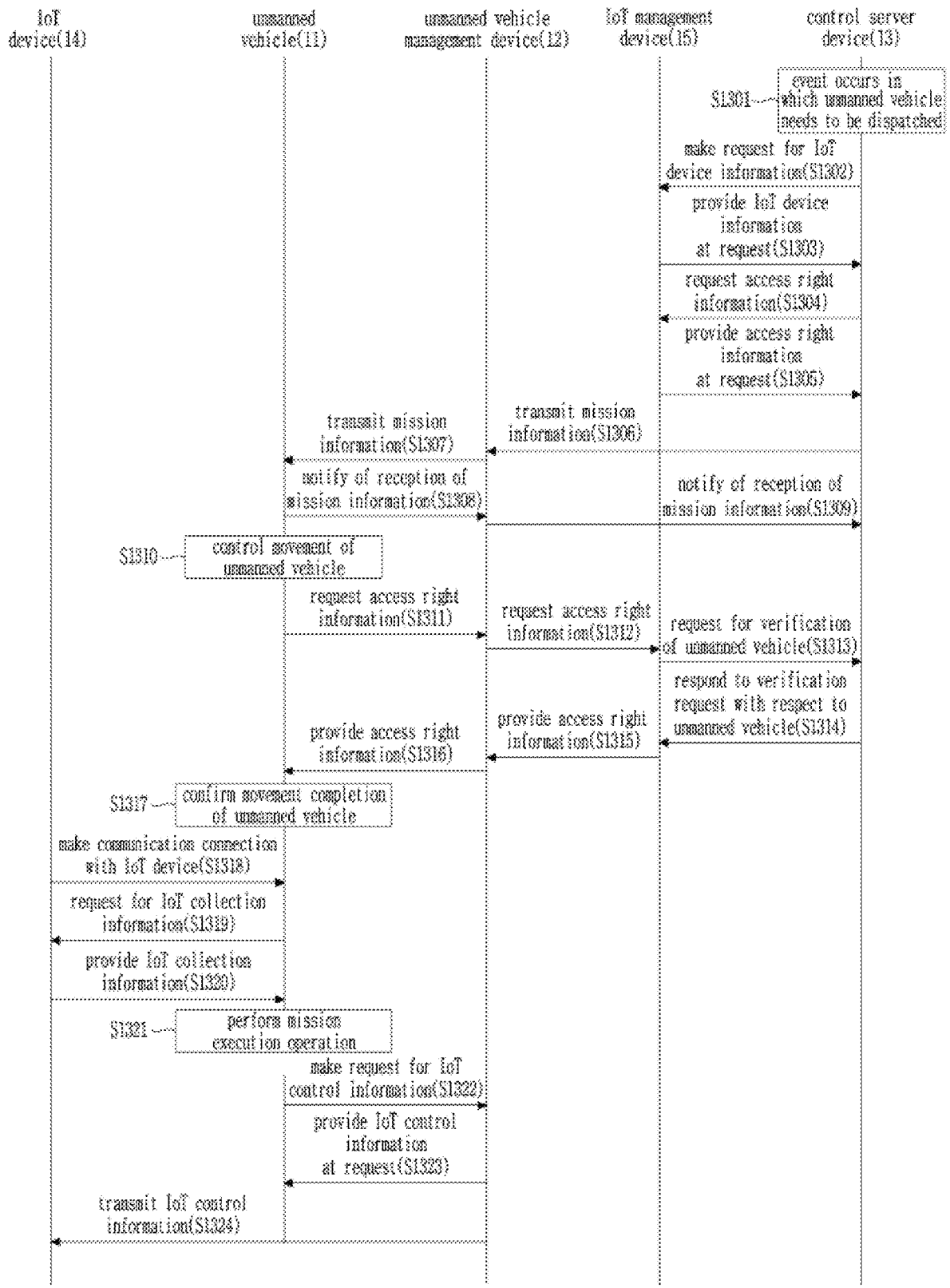
[FIG. 13]

[FIG. 14]
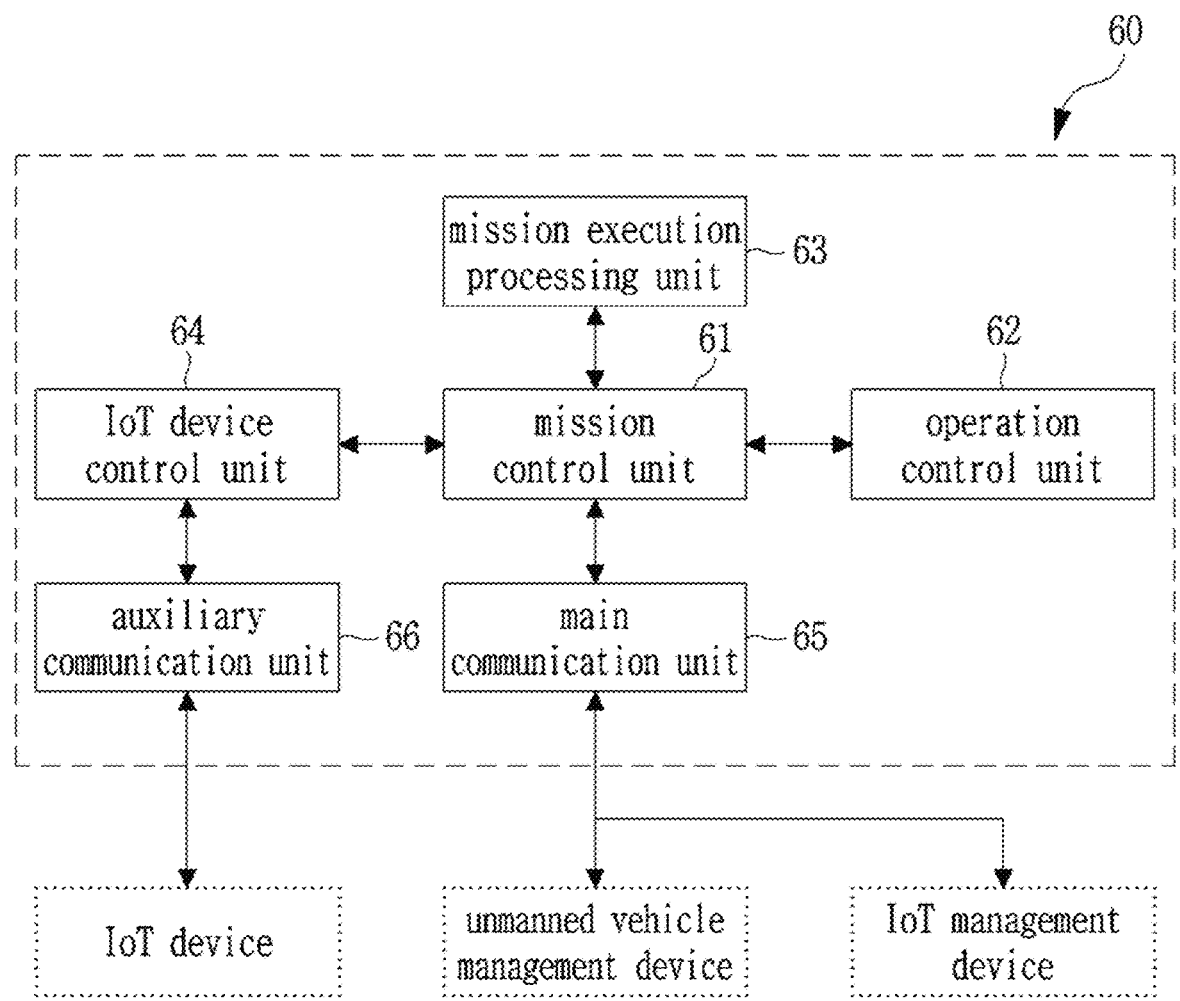

[FIG. 15]
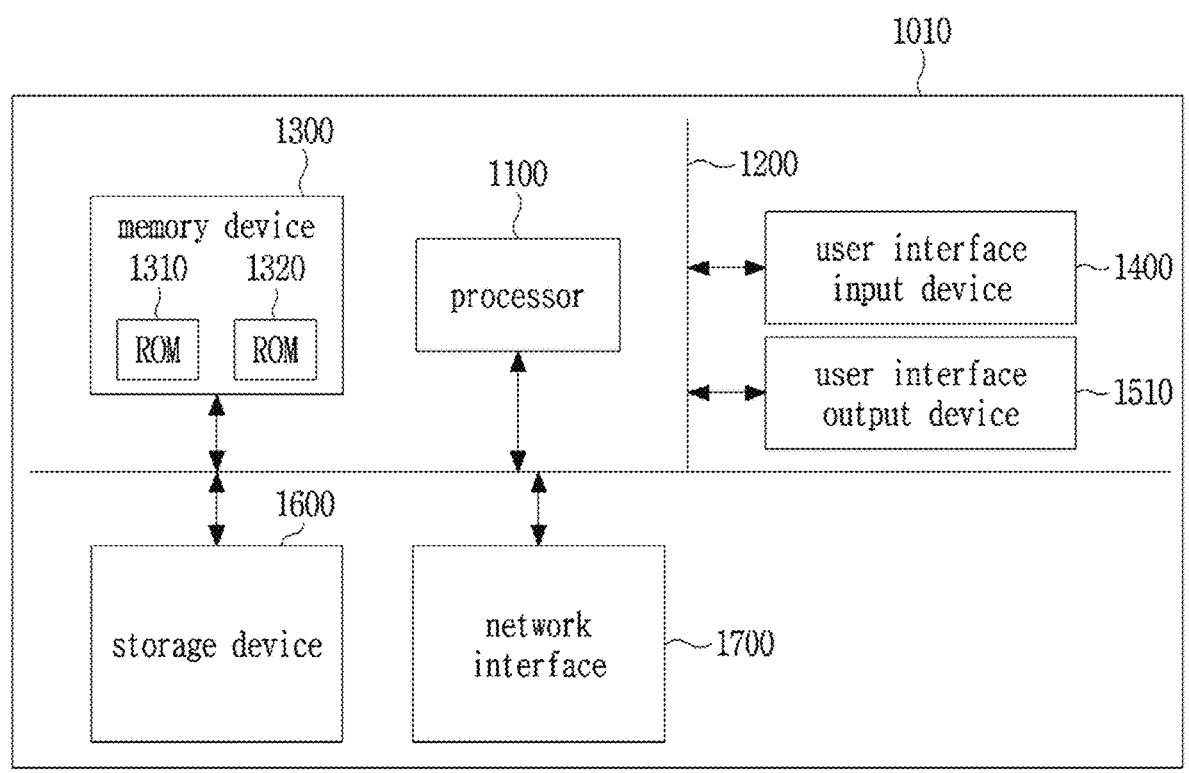

UNMANNED VEHICLE CONTROLLING SYSTEM AND METHOD OF OPERATING SAME

CROSS REFERENCE TO RELATED APPLICATION

The present application claims priority to Korean Patent Application Nos. 10-2018-0006587, 10-2018-0039362, and 10-2018-0094306 filed Jan. 18, 2018, Apr. 4, 2018, and Aug. 13, 2018 the entire contents of which is incorporated herein for all purposes by this reference.

BACKGROUND OF THE DISCLOSURE

1. Field of the Disclosure

The present disclosure relates to an unmanned vehicle controlling system and a method of operating the same. More particularly, the present disclosure relates to a system for directly or indirectly connecting unmanned vehicles with each other in an adaptive manner according to an established communication environment, and a method of operating the same system.

2. Description of the Background Art

An unmanned vehicle (also called uncrewed vehicle) refers to a vehicle that autonomously percepts external environments, determines a current situation, and takes necessary measures if needed. It, is known that unmanned vehicles can detect and learn the amount of their motion and their surrounding environments by themselves, perform self-control to move themselves, move other objects, control themselves or other vehicles according to preset schedules, perform given missions, and communicate with operators. Unmanned vehicle systems (or unmanned systems) can be categorized into unmanned aerial systems (UASs), unmanned ground systems (UGSs), unmanned maritime systems (UMS), etc. according to operating conditions. The UMSs include unmanned surface vehicles (USVs) and unmanned underwater vehicles (UUVs).

With recent rapid development of industrial technology and information and communication technology, the technological development of unmanned aerial vehicles (UAVs) such drones have been accelerated and UAVs have increasingly found their applications in a wide area.

For example, it is possible to supply medical goods or emergency relief goods to a disaster area where transportation is not available using drones (i.e., UAVs) equipped with a cargo-carrying means. In addition, there is attempt to use drones in a delivery service to promptly deliver ordered items to customers who have placed orders. Furthermore, unmanned aerial vehicles (UAVs) equipped with a camera are now being used for broadcasting sports games, for monitoring safety-related accidents at beaches, construction sites, and the like, or for performing dangerous tasks on behalf of people, for example, spraying pesticides on agricultural lands or working on places to which it is difficult for people to access. In this way, UAVs are now in use in various fields.

Various types of unmanned vehicles such as unmanned ground vehicles (UGVs), unmanned aerial vehicles (UAVs), and unmanned maritime vehicles (UMVs) that can self-operate without a human operator (i.e., driver, pilot, or navigator) aboard have been actively developed, researched, and studied. In particular, there have been intensive research and diverse attempts to utilize unmanned vehicles in extreme environments where people are exposed to dangers or are difficult to access.

Table 1 lists communications schemes for unmanned vehicle systems. Referring to Table 1, a machine as the terminology expressing the concept of all unmanned vehicles. Communications performed by the machine includes machine-to-machine communications, machine-to-infrastructure (e.g., mobile communication base station) communications, and internal machine communications. Types of communications for unmanned aerial systems (UAS, airplane in Table 1), unmanned ground systems (UGS, vehicle in Table 1) and unmanned maritime systems (UMS, water vehicle in Table 1) may also be categorized in the same form.

TABLE 1

| | Machine |
|---|---|
| M2M | Machine-to-Machine Communications |
| M2I | Machine-to-Infrastructure Communications |
| IMC | Internal Machine Communications |
| | Airplane |
| A2A | Airplane-to-Airplane Communications |
| A2I | Airplane-to-Infrastructure Communications |
| IAC | Internal Airplane Communications |
| | Vehicle |
| V2V | Vehicle-to-Vehicle Communications |
| V2I | Vehicle-to-Infrastructure Communications |
| IVC | Internal Vehicle Communications |
| | Water Vehicle |
| W2W | Water Vehicle-to-Water Vehicle Communications |
| W2I | Water Vehicle-to-Infrastructure Communications |
| IWC | Internal Water Vehicle Communications |

Currently, no direct communication method defined for UAVs, UGVs, USVs, or UUVs is available. There have been only indirect communication methods of connecting these unmanned vehicles with control centers. Meanwhile, recently, unlike UGS s and UMSs, a communication standard for control communication (namely, Control Non Payload Communication (CNPC)) for UASs has been established by Radio Technical Commission for Aeronautics (RICA).

As described above, there is no available method for direct communications between unmanned vehicles, and each of the unmanned vehicles individually has a private communication system and a private communication network independently established. However, for collaboration of unmanned vehicle systems which will be required in the future, there is a need for a way to link unmanned vehicle systems to each other.

BACKGROUND OF THE DISCLOSURE

A technical problem to be solved by the present disclosure is to provide an unmanned vehicle control system and a method of operating same.

More particularly, another technical problem to be solved by the present disclosure is to provide a system for directly or indirectly connecting unmanned vehicles with each other in an adaptive manner according to an established communication environment and to a method of operating the system.

The technical problems to be solved by the present disclosure are not limited to the ones mentioned above, and other technical problems which are not mentioned can be clearly understood by those skilled in the art from the following description.

In order to achieve the above object, according to one aspect of the present invention, there is provided a method of operating a terminal controlling system, the method comprising: by a first terminal, detecting a second terminal and producing detection result information; by the first terminal, transmitting the detection result information to a first control device controlling the first terminal; by the first control device, making a request to a server device for information on the second terminal; by the first control device, making request to a second control device controlling the second terminal for inter-terminal interworking, using the information on the second terminal received from the server device; by the first control device, receiving a response to the inter-terminal interworking request from the second control device; and by the first terminal, communicating with the second terminal based on the response received from the first control device.

According to another aspect of the present disclosure, there is provided a terminal control system comprising: a first terminal configured to detect a second terminal and transmit detection result information resulting from the detection to a first control device; the first control device configured to control the first terminal; and a server device configured to provide information on the second terminal to the first control device, wherein the first control device makes an inter-terminal interworking request to a second control device configured to control the second terminal, using the information on the second terminal received from the server device, and receives a response to the inter-terminal interworking request, and the first terminal communicates with the second terminal based on the response received from the first control device.

According to another aspect of the present disclosure, there is provided an unmanned vehicle operation system comprising: at least one IoT device; an IoT management device configured to manage information on the at least one IoT device; at least one unmanned vehicle configured to move to a position corresponding to movement position information and to communicate data with at least one IoT device located at the position corresponding to the movement position information; an unmanned vehicle management device connected to the at least one unmanned vehicle over a wireless communication network and configured to manage movement of the at least one unmanned vehicle; and a control server device connected to the IoT management device and the unmanned vehicle management device, check the IoT device information managed by the IoT management device, and provide mission information including the IoT device information and information instructing movement of the at least one unmanned vehicle to the unmanned vehicle management device.

According to the present disclosure, an unmanned vehicle controlling system and a method of operating the system can be provided.

In addition, according to the present disclosure, a system for directly or indirectly connecting unmanned vehicles in an adaptive manner according to an established communication environment for a plurality of unmanned vehicles and a method of operating the system can be provided.

It will be appreciated by persons skilled in the art that the effects that can be achieved with the present disclosure are not limited to what has bees particularly described hereinabove and other advantages of the present disclosure will be more clearly understood from the following detailed description taken in conjunction with the accompanying drawings.

BRIEF DESCRIPTION OF THE DRAWINGS

FIG. 1 is a diagram illustrating as unmanned vehicle system connection structure according to one embodiment of the present disclosure, in which there are multiple networks of respective unmanned vehicles and control stations are located within the corresponding networks;

FIG. 2 is a diagram illustrating an unmanned vehicle system connection structure according to one embodiment of the present disclosure, in which there are multiple networks of respective unmanned vehicles and control stations are located within a public network;

FIG. 3 is a diagram illustrating an unmanned vehicle system connection structure according to one embodiment of the present disclosure, in which there is an unmanned vehicle network shared by multiple unmanned vehicles and control stations are located within the unmanned vehicle network;

FIG. 4 is a diagram illustrating an unmanned vehicle system connection structure according to one embodiment of the present disclosure, in which there is an unmanned vehicle network shared by multiple unmanned vehicles and control stations are located within a public network;

FIG. 5 is a diagram illustrating a communication connection process for communication between two unmanned vehicle systems which make a direct connection through exchange of setting information, according to one embodiment of the present invention;

FIG. 6 is a diagram illustrating a communication connection process for communication between two unmanned vehicle systems which make a direction connection without exchanging setting information, according to one embodiment of the present invention;

FIG. 7 is a diagram illustrating a communication connection process for communication between two unmanned vehicle systems which make an indirect connection, according to one embodiment of the present disclosure;

FIG. 8 is a block diagram illustrating the configuration of an unmanned vehicle control system according to one embodiment of the present disclosure;

FIG. 9 is a diagram illustrating an unmanned vehicle operation system for operating unmanned vehicles, according to one embodiment of the present disclosure;

FIG. 10 is diagram illustrating access right information used in the unmanned vehicle operation system according to one embodiment of the present disclosure;

FIG. 11 is a diagram illustrating a signal flow during operation of the unmanned vehicle operation system according to a first embodiment of the present disclosure;

FIG. 12 is a diagram illustrating a signal flow during operation of an unmanned vehicle operation system according to a second embodiment of the present disclosure;

FIG. 13 is a diagram illustrating a signal flow during operation of an unmanned vehicle operation system according to a third embodiment of the present disclosure;

FIG. 14 is a block diagram illustrating the configuration of an unmanned vehicle according to one embodiment of the present disclosure; and FIG. 15 is a block diagram illustrating various devices provided in the unmanned vehicle operation system according to one embodiment of the present disclosure and a computing system for executing an unmanned vehicle control method according to one embodiment of the present disclosure.

DETAILED DESCRIPTION OF THE DISCLOSURE

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not, specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Hereinbelow, exemplary embodiments of the present disclosure will be described in detail with reference to the accompanying drawings. Throughout the drawings, the same reference numerals will refer to the same or like parts.

In order to link various types of unmanned vehicle systems for interworking thereof, a network structure enabling communication between various types of unmanned vehicles or between control stations for controlling the corresponding types of unmanned vehicles is required. Currently, most of unmanned vehicles are operated through a point-to-point direct connection, i.e., a connection between each of the unmanned vehicles and a corresponding control station, rather than using a dedicated network for unmanned vehicles. Here, the term "control station" refers to a ground control system (GCS) or an unmanned vehicle control device. For example, the control station is a ground control system that performs tasks such as flight control, mission planning, real-time control, image processing, and image storage of unmanned vehicles. Therefore, in order to link various types of unmanned vehicle systems in future, a network dedicated to unmanned vehicle systems needs to be constructed. FIGS. 1 to 4 are views illustrating representative connection structures for unmanned vehicles.

FIG. 1 is a diagram illustrating an unmanned vehicle system connection structure according to one embodiment of the present disclosure, in which there are networks of respective unmanned vehicles and control stations are located within the respective networks.

Referring to FIG. 1, there are different types of unmanned vehicles such as UAVs 110, UGVs 120, and UMVs 130 and networks 114, 124, and 134 dedicated to the UAVs 110, the UGVs 120, and the UMVs 130, respectively. Each of the dedicated networks is connected to a public network 140 so as to be interworked with each other. Control stations for the respective types of unmanned vehicles are located within the corresponding dedicated networks, respectively. That is, a UAV control station 112 for controlling the UAV 110 is provided within the UAV-dedicated network 114, a UGV control station 122 for controlling the UGV 120 is provided within the UGV-dedicated network 124, and a UMV control station 132 for controlling the UMV 130 is provided within the UMV-dedicated network 134. The network structure constructed as illustrated in FIG. 1 has an advantage that an optimized network suitable for each type of unmanned vehicle systems can be configured because a separate network is configured for each type of unmanned vehicle systems. However, when direct communication between different types of unmanned vehicle systems for interworking thereof is not supported, there is a disadvantage that communication between different types of unmanned vehicle systems needs to be performed via gateways and a public network 140, which leads to a long communication path for interworking between the unmanned vehicle systems.

FIG. 2 is a diagram illustrating an unmanned vehicle system connection structure according to one embodiment of the present disclosure, in which there are multiple networks of respective unmanned vehicles and control stations are located within a public network.

Referring to FIG. 2, the structure is similar to that of FIG. 1 in that networks for different types of unmanned vehicle systems are respectively configured, but the difference is that control stations for controlling the unmanned vehicles systems are provided outside the corresponding dedicated networks. That is, different types of unmanned vehicles, namely, the UAV 210, the UGV 220, and the UMV 230 have their own dedicated networks. Specifically, the UAV 210 has a UAV-dedicated network 214, the UGV 220 has a UGV-dedicated network UGV 224, and the UMV 230 has a UMV-dedicated network 234. Meanwhile, a UAV control station 212 for controlling the UAV 210, a UGV control station 222 for controlling the UGV 220, and a UMV control station 232 for controlling the UMV 230 all are located within the public network 240. In the network structure illustrated in FIG. 2, it is assumed that the control stations are located in various places as well as around ground wireless stations so that unmanned vehicles are remote-controlled. Since all the control stations are located within the same network (public network 240), it is not necessary to involve two gateways for communication between the control stations. Therefore, when making a connection for communication between the control stations, a network delay time is reduced compared with the case of FIG. 1 in which the connection between the control stations involves two gateways. However, since the network in which the control stations are located and the network in which each of the unmanned vehicles is located are different networks independent of each other, a network delay for connection between one unmanned vehicle and the corresponding control station is increased compared with the case of FIG. 1.

FIG. 3 is a diagram illustrating an unmanned vehicle system connection structure according to one embodiment of the present disclosure. In this embodiment, there is an unmanned vehicle network over which unmanned vehicles are connected to each other, and control stations are also located within the same network.

Referring to FIG. 3, there is a common unmanned vehicle network 350 shared by all unmanned vehicles (namely, different types of unmanned vehicles including UAVs 310, UGVs 320 and UMVs 330s), and the UAV control station 312 for the UAVs 312, the UGV control station 322 for the UGVs 320, and the UMV control station 332 for the UMVs 330 all are located within common unmanned vehicle network 350. The network structure as illustrated in FIG. 3 has an advantage of reducing a network delay time compared to the structure of FIG. 1 or 2 because a communication connection between the unmanned vehicles is made within the same gateway station. In this case, however, since the network needs to be configured such that all of the unmanned vehicles (namely, different types of unmanned vehicles) can be connected to each other, operating conditions and required performances and specifications that vary from vehicle to vehicle must be considered for configuration of the network. For this reason, the complexity of the network will increase.

FIG. 4 is a diagram illustrating an unmanned vehicle system connection structure according to one embodiment of the present disclosure, in which there is an unmanned vehicle network shared by multiple unmanned vehicles and control stations are located within a public network.

Referring to FIG. 4, the structure is similar to that of FIG. 3 in that all of the unmanned vehicles share one network. However, the different point is that the control stations are located within the same network, i.e., the public network in the structure of FIG. 4. That is, there is an unmanned vehicle network 450 shared by all unmanned vehicles (namely, by all types of unmanned vehicles including UAVs 410, UGVs 420 and UMVs 430), a UAV control station 412 for the UAVs 412, a UGV control station 422 for the UGVs 420, and a UMV control station 432 for the UMVs 430 are located within a public network 440. In the network structure as illustrated in FIG. 4, it is assumed that the control stations are located in various places as well as around ground wireless stations so that unmanned vehicles are remote-controlled. This case has an advantage that the control stations can be located in more general places but also comes with a disadvantage that the network delay time may increase as compared with the structure of FIG. 3.

On the other hand, even though there is an established communication standard defined for interworking between unmanned vehicle systems, there will be a case where some unmanned vehicles are not equipped with a communication module required for the interworking of the unmanned vehicles. In addition, there may be other various cases. For example, some unmanned vehicles are of network type, and some unmanned vehicles are of stand-alone type. Therefore, a universal method for enabling interworking between various types of unmanned vehicle systems is needed.

Therefore, the present disclosure presents methods of controlling unmanned vehicles: one for a case where there is a vehicle-to-vehicle direct link for interworking between unmanned vehicle systems (namely, there is a V2V link by which a direct connection between unmanned vehicle systems is possible) and another for a case there is no V2V direct-connection link.

When there is a V2V link enabling a direction connection between unmanned vehicle systems, unmanned vehicle systems may be equipped with a V2V link supporting module. For this case, there will be two control methods: one method is for a case where a V2V communication standard supports a common channel for accommodating a V2V connection (namely, supporting an immediate V2 connection), and the other is for case where the standard does not support the common channel. When a V2V communication standard supports a common channel for accommodating V2V connections, unmanned vehicle systems can immediately initiate a V2V communication connection. Conversely, when the V2V communication standard does not support a common channel for accommodating V2V connections, setting information to be used for V2V communication will be exchanged and set for the direct communication between the unmanned vehicle systems to perform interworking. Meanwhile, in either case of the above cases, a mutual verification process is required in which unmanned vehicle systems to be inter-worked verify each other to confirm that their opponent is suitable for interworking.

FIG. 5 is a diagram illustrating a communication connection process for communication between two unmanned vehicle systems according to one embodiment of the present disclosure, in which the two unmanned vehicle systems make a direct connection by exchanging setting information with each other.

Referring to FIG. 5, the unmanned vehicle control system according to the present disclosure includes a UxV-1 1000 (corresponding to a first terminal) a UxV-1 GCS 2000 (corresponding to a first control device or a first control station for controlling the first terminal), and a server 3000 (corresponding to a UxV DB server). Further, the unmanned vehicle control system according to the present disclosure may further include, but not limitedly, a UxV-2 1500 (corresponding to a second terminal) and a UxV-2 GCS 2500 (corresponding to a second control device or a second control station for controlling the second terminal).

In Step S500, the UxV-1 1000 may perform detection of the UxV2 1500. According to one embodiment, the detection may be performed such that whether there is an unmanned vehicle (for example, UxV2 1500) is first determined through an image recognition process and then identification information on a detected unmanned vehicle is obtained. For example, the identification information on the detected unmanned vehicle may be obtained such that the identification information marked on the unmanned vehicle may be recognized through image recognition. Alternatively, the identification information may be exchanged between two unmanned vehicles through a common channel when a direction communication between the two unmanned vehicles available. Additionally, position information and image information of the detected unmanned vehicle may be obtained, and the obtained information may be used by an unmanned vehicle management server for identification of unmanned vehicles that are in operation within a predetermined region.

In Step S505, the UxV-1 1000 may provide detection result information that results from detection of the UxV2 1500 to the UxV-1 GCS 2000. For example, the detection result information may include information indicating the presence or absence of the UxV2 1500, identification information on the UxV2 1500, position information indicating the position of the UxV2 1500, or it information of the UxV2 1500.

In Step S510, the UxV-1 GCS 2000 may make a request to the UxV DB server 3000 to verify the UxV-2 1500 on the basis of the detection result information and to provide thereto information on the UxV-2 1500.

In Step S515, the UxV DB server 3000 provides the information on the UxV-2 1500 to the UxV-1 GCS 2000 to fulfill the request.

In Step S1320, the UxV-1 GCS 2000 may make a request for interworking between the unmanned vehicles to the UxV-2 GCS 2500 on the basis of the received information.

In Step S525, the UxV-2 GCS 2500 may make a request to the UxV DB server 3000 to provide thereto the information on the UxV-1 1000.

In Step S530, the UxV DB server 3000 may provide information on the UxV-1 1000 to the UxV-2 GCS 2500 to fulfill the request.

In Step S535, the UxV-2 GCS 2500 may transmit a request permission message to the UxV-1 GCS 2000 as a response to the request for interworking.

In Step S540, the UxV-1 GCS 2000 may provide the UxV-1 1000 with communication setting information required for the interworking. In addition, the UxV-1 GCS 2000 may instruct the UxV-1 1000 to interwork with the UxV-2 2000.

In Step S545, the UxV-2 GCS 2500 may provide the UxV-2 1500 with communication setting information for the interworking. In addition, the UxV-2 GCS 2500 may instruct the UxV-2 1500 to interwork with the UxV-1 1000.

In Step S550, the UxV-1 1000 may make a request to the UxV-2 1500 for a communication connection.

In Step S555, the UxV-2 1500 may transmit a request permission message to the UxV-1 1000 as a response to the connection request from the UxV-1 1000.

In Step S560, a communication connection between the UxV-1 1000 and the UxV-2 1500 may be made so that the UxV-1 1000 and the UxV-2 1500 can interwork with each other.

FIG. 6 is a diagram illustrating a communication connection process for communication between two unmanned vehicle systems that make a direct communication connection without exchanging setting information, according to one embodiment of the present disclosure.

In Step S600, the UxV-1 1000 searches for the UxV2 1500. According to one embodiment, the detection may be performed such that whether there is an unmanned vehicle (for example, UxV2 1500) is first determined through an image recognition process and then identification information on a detected unmanned vehicle is obtained. For example, the identification information on the detected unmanned vehicle may be obtained such that the identification information marked on the unmanned vehicle may be recognized through image recognition. Alternatively, the identification information may be exchanged between two unmanned vehicles through a common channel when a direction communication between the two unmanned vehicles is available. Additionally, position information and image information of the detected unmanned vehicle may be obtained, and the obtained information may be used by an unmanned vehicle management server for identification of unmanned vehicles that are in operation within a predetermined region.

In Step S550, in order to make a communication connection, the UxV-1 1000 may provide the UxV-2 2000 with information on itself and makes a request to the UxV-2 1500 for information on the UxV-2 2000. That is, the UxV-1 1000 and the UxV-2 1500 may exchange their identification information with each other.

In Step S610, the UxV-2 1500 may provide the UxV-1 1000 with the information requested by the UxV-1 for making a connection.

In Step S615, the UxV-1 1000 may provide the UxV-1 GCS 2000 with the information received from the UxV-2 1500 and request permission for a connection.

In Step S620, the UxV-1 GCS 2000 may make a request to the UxV DB server 3000 for information on the UxV-2 1500 on the basis of the received information.

In Step S625, the UxV DB server 3000 may provide the UxV-1 GCS 2000 with the information on the UxV-2 1500 to fulfill the request.

In Step S630, the UxV-1 GCS 2000 may transmit a connection permission message to the UxV-1 1000 on the basis of the received information, thereby allowing the connection between the UxV-2 1500 and the UxV-1 1000.

In Step S635, the UxV-2 1500 may provide the UxV-2 GCS 2500 with the information received from the UxV-1 1000 and request permission for connection.

In Step S640, the UxV-2 GCS 2500 may make a request to the UxV DB server 3000 for information on the UxV-1 1000 on the basis of the received information.

In Step S645, the UxV DB server 3000 may provide the UxV-2 GCS 2500 with the information on the UxV-1 1000 to fulfill the request.

In Step S650, the UxV-2 GCS 2500 may provide the UxV-2 1500 with a response of permitting connection with the UxV-1 1000 on the basis of the received information.

In Step S655, the UxV-1 1000 may make a request to UxV-2 1500 for a communication connection.

In Step S660, the UxV-2 1500 may inform the UxV-1 1000 of the permission for communication connection as a response to the communication connection request.

In Step S665, the communication connection between the UxV-1 1000 and the UxV-2 1500 is performed so that the UxV-1 1000 and the UxV-2 1500 can be interworked with each other.

FIG. 7 is diagram illustrating a communication connection process for communication between two unmanned vehicle systems that make an indirect communication connection, according to one embodiment of the present disclosure.

While FIGS. 5 and 6 illustrate the communication connection process for communication between unmanned vehicle systems when a V2V link for a direct connection between the unmanned vehicle systems is available. FIG. 7 illustrates the communication connection process for communication between unmanned vehicle systems when a V2V link for a direct connection between is not available. In the case of FIG. 7, the unmanned vehicles can be connected via unmanned vehicle control stations. As having been described above with reference to FIGS. 1 to 4, the unmanned vehicle control stations may be networked in diverse manners. For example, they may be located within a single dedicated network, located in respective dedicated networks, located within a public network, or provided as standalone stations. Accordingly, according to the present disclosure, unmanned vehicle control stations may be connected to each other for interworking between unmanned vehicles in a case where there is no V2V link enabling a direct connection between the unmanned vehicles. On the other hand, when one unmanned vehicle control station is of a standalone type, it can be connected to another control station via an additional wired or wireless communication device and a public network. Even when there is a V2V link enabling a direct connection, an indirect connect on involving control stations may be performed, depending on situations.

In Step S700, the UxV-1 1000 may search for the UxV-2 1500. According to one embodiment, the detection may be performed such that whether there is an unmanned vehicle (for example, UxV2 1500) is first determined through an image recognition process and then identification information on a detected unmanned vehicle is obtained. For example, the identification information on the detected unmanned vehicle may be obtained such that the identification information marked on the unmanned vehicle may be recognized through image recognition. Alternatively, the identification information may be exchanged between two unmanned vehicles through a common channel when a direction communication between the two unmanned vehicles is available. Additionally, position information and image information of the detected unmanned vehicle may be obtained, and the obtained information may be used by an unmanned vehicle management server for identification of unmanned vehicles that are in operation within a predetermined region.

In Step S705, the UxV-1 1000 may provide detection result information that results from the detection of the UxV2 1500 to the UxV-1 GCS 2000. For example, the detection result information may include information indicating the presence or absence of the UxV2 1500, identification information on the UxV2 1500, position information indicating the position of the UxV2 1500, or image information of the UxV2 1500.

In Step S710, the UxV-1. GCS 2000 may make a request to the UxV DB server 3000 to verify the UxV-2 1500 on the basis of the detection result information and to provide thereto information on the UxV-2 1500.

In Step S715, the UxV DB server 3000 may provide information on the UxV-2 1500 at, the request by the UxV-1 GCS 1500.

In Step S720, the UxV-1 GCS 2000 may make a request for interworking between the unmanned vehicles to the UxV-2 GCS 2500 using the received information.

In Step S725, the UxV-2 GCS 2500 may make a request to the UxV DB server 3000 to provide thereto the information on the UxV-1 1000.

In Step S730, the UxV DB server 3000 may provide the UxV-2 GCS 2500 with the information on the UxV-1 1000 to fulfill the request.

In Step S735, the UxV-2 GCS 2500 may transmit a request permission message to the UxV-1 GCS 2000 as a response to the request for interworking.

In Step S740, a secure tunnel may be created between the UxV-1 GCS 2000 and the UxV-2 GCS 2500.

In Step S745, the UxV-1 GCS 2000 may inform the UxV-1 1000 of a state of being interworked with the UxV-2 1500.

In Step S750, the UxV-2 GCS 2500 may inform the UxV-2 1500 of a state of being interworked with the UxV-1 1000.

In Step S755, the UxV-1 1000 may make a request to UxV-1 GCS 2000 for a communication connection with the UxV-2 1500. In Step S760, the UxV-1 GCS 2000 may transmit a connection request message to the UxV-2 GCS 2500. In Step S765, the UxV-2 GCS 2500 may provide the connection request message to the UxV-2 1500. In Step S770, the UxV-2 1500 may respond to the connection request made by the UxV-2 2500. In Step S775, the UxV-2 GCS 2500 may transmit a response message to the UxV-1 GCS 2000. In Step S780, the UxV-1 GCS 2000 may transmit the response message to the UxV-1 1000. In Step S785, an indirect link between the UxV-1 1000 and the UxV-2 1500 may be constructed.

On the other hand, according to the present disclosure, the UxV-1 GCS and the UxV-2 GCS may exist within the same network or respectively in different networks. In addition, according to the present disclosure, the UxV-1 GCS and the UxV-2 GCS may exist within the same network as the UxV DB server or within in different networks.

FIG. 8 is a block diagram illustrating the configuration of an unmanned vehicle control system according to one embodiment of the present disclosure;

Referring to FIG. 8, a terminal control system 800 includes a terminal 810, a control device 820, and/or a server 830. It should be noted, however, that this illustrates only some of the components which are necessary for describing the present embodiment among all of the components of the terminal control system. Therefore, the components of the terminal control system 800 may not be limited thereto. In addition, according to one embodiment, the terminal 810 may include a first terminal 810-1 or a second terminal 810-2, and the control device 820 may include a first control device 820-1 for controlling the operation of the first terminal or a second control device 820-2 for controlling the operation of the second terminal. The terminal control system 800 according to one embodiment may include a first terminal 810-1, a first control device 820-1, and a server 830. The first terminal 810-1 may detect a second terminal 810-2 and transmit detection result information to the first control device 820-1. The first control device 820-1 may control the first terminal 810-1. The server 830 may provide information on the second terminal 810-2 to the first control device 820-1. The first control device 820-1 may make an inter-terminal interworking request to a second control device 810-2 that controls the second terminal 810-2 using the information on the second terminal 810-2 received from the server 830, and receive a response to the inter-terminal interworking request from the second control device 820-2. Thus, the first terminal 810-1 can communicate with the second terminal 810-2 according to the response received from the second terminal 810-2.

The first terminal 810-1 may exchange the identification information with the second terminal 810-2 when there is a common channel between the first terminal 810-1 and the second terminal 810-2 for a V2V connection specified in a V2V communication standard.

The detection result information may include information indicating the presence or absence of the second terminal 810-2, the identification information on the second terminal 810-2, the position information indicating the position of the second terminal 810-2, or the image information of the second terminal 810-2.

In addition, the server 830 may manage setting information for the V2V connection of the terminal 810, identification information on the terminal 810, mission execution position information, a management, agency, or a control device connection method. The server 830 may perform authentication with respect to the control device 820.

The second control device 820-2 may request the server 830 to transmit the information on the first terminal 810-1 thereto and may respond to the inter-terminal interworking request issued by the first control device 820-1 on the basis of the received information on the first terminal 810-1.

When there is no V2V link enabling a direct connection between the first terminal 810-1 and the second terminal 810-2, the first control device 820-1 may create a tunnel (i.e. make a connection) between the first control device 820-1 and the second control device 820-2 according to the response of the second control device 820-2 and may communicate with the second terminal 810-2 based on the tunnel connection.

Recently, thanks to the Internet of Things (IoT) technology, it is possible to remotely monitor the status and environment of an object without visiting the site where the object is located in person. This IoT technology has found its application in various fields such as home automation, factory automation, and smart city foundation.

According to the present disclosure, it is possible to provide a method and apparatus for providing an environment in which IoT devices and unmanned vehicles are fused and operated in combination. In addition, according to the present disclosure, it is possible to provide a method and apparatus for increasing operations (functions) of unmanned vehicles by enabling the unmanned vehicles to use information obtained by IoT devices. In addition, according to the present disclosure, it is possible to provide a method and apparatus for efficiently utilizing information collected by IoT devices and for effectively controlling operations of the IoT devices by using unmanned vehicles. In addition, according to the present disclosure, it is possible to provide a method and apparatus capable of increasing the applications of unmanned vehicles and IoT devices by combining an unmanned vehicle and an IoT device such that they complement each other to overcome the disadvantages thereof such as limited resources and environments in addition, according to the present disclosure, an unmanned vehicle can carry out a mission using an IoT device with a reduced number of pieces of equipment mounted on the unmanned vehicle. Due to the reduction in the number of pieces of equipment, it is possible to reduce power consumption of the unmanned vehicle and increase the speed of the unmanned vehicle.

FIG. 9 is a diagram illustrating an unmanned vehicle operation system to which unmanned vehicles according to one embodiment of the present disclosure apply.

An unmanned vehicle operating system 10 may include an unmanned vehicle 11, an unmanned vehicle management device 12, a control server device 13, at least one IoT device 14, and an IoT management device 15.

The unmanned vehicle 11 may receive mission information from the unmanned vehicle management unit 12. The mission information may include movement instruction information regarding the movement of the unmanned vehicle 11 and mission execution information regarding a mission to be performed by the unmanned vehicle 11. The unmanned vehicle 11 may check the movement instruction information contained in the mission information and move to a target destination (position) based on the movement instruction information.

For example, the movement instruction information may include movement position information indicating the target destination to which the unmanned vehicle 11 is to move, and movement route information indicating a route from a current position of the unmanned vehicle 11 to the target destination. The movement route information may include way point information indicating at least one way point on the way to the target destination. The way point information may include coordinate information including a longitude coordinate and a latitude coordinate and altitude information.

The unmanned vehicle 11 may be equipped with positioning device (for example, a GPS receiver module) with which the unmanned vehicle 11 can confirm the current position where the unmanned vehicle is located. With this positioning device, the unmanned vehicle 11 can generate a control signal guiding itself to at least one way point on the way to the target destination.

The unmanned vehicle 11 may include one or more rotary motors, one or more rotors (or wheels) respectively coupled to the one or more rotary motors, and a motion sensor for detecting motion of the unmanned vehicle 11. The control signals may include a signal for driving the one or more rotary motors so that the unmanned vehicle 11 can move to the way point on the route to the target destination. Further, the control signal may include a signal for instructing the unmanned vehicle 11 to maintain a stable position and to continuously move to the way point in the stable position by using motion information detected by the motion sensor.

In particular, the unmanned vehicle 11 according to one embodiment or the present disclosure can perform an operation of connecting itself to one or more IoT devices 14 located at the position (s) corresponding to the movement position information, an operation of collecting IoT collection information provided by one or more IoT devices 14, or an operation of transmitting IoT control information to the one or more IoT devices 14 to control the one or more IoT devices 14.

Specifically, the unmanned vehicle 11 may perform the operation described below to make a connection with at least one IoT device 14 located at the position corresponding to the movement position information.

The unmanned vehicle 11 may detect at least one IoT device 14 located in the vicinity of the position corresponding to the movement position information. For example, the mission information provided by the unmanned vehicle management device 12 may include IoT identification information used to identify the IoT devices, and the unmanned vehicle 11 may identify the least one IoT device 14 using the IoT identification information.

In addition, the unmanned vehicle 11 may check access right information with respect to one IoT device 14. In order to check the access right information, the unmanned vehicle 11 may receive access right information for at least one IoT device 14 from the unmanned vehicle management device 12 by making a request for the access right information to the unmanned vehicle management device 12. For example, when making a request for the access rights information, the unmanned vehicle 11 may transmit information indicating a required access level required to perform a given mission to the unmanned vehicle management device 12 and receive a response from the unmanned vehicle management device 12, the response indicating whether the required access level is permitted or not. The operation that the unmanned vehicle management device 12 confirms whether or not the required access level is permitted will be described below in detail when describing the configuration and operation of the unmanned vehicle management device 12 described below.

As another example of checking and confirming of the access right information by the unmanned vehicle, the mission information may include the access right information as well as the IoT identification information, and the unmanned vehicle 11 may check and confirm the access right information from the mission information.

The access right information indicates an access level with respect to a target IoT device 14. Examples of the access level are shown in FIG. 10.

Among multiple access levels, a first access level is set such that an entity having the first access level has rights to access basic IoT collection information collected by basic functions of the target IoT device 14, and a second access level is set such that an entity having the second access level has rights to access extended IoT collection information collected by extended functions of the target IoT device 14. A fourth access level may be set have the rights of an administrator with respect to the target IoT device 14. Here, the rights of an administrator may mean the authority to control all operations of the target IoT device 14, such as stopping operation of the target IoT device 14 or turning off the target IoT device 14. In consideration of this, a third access level may be set to control the operation of the target IoT device 14 with the control signal provided by the unmanned vehicle 11. However, the third access level may be set such that an entity having the third access level cannot stop the operation of the device or cannot turn off the device.

In order to get information which requires a higher access level, the unmanned vehicle 11 that is set to have the first access level or the second access level may change the setting to have the third access level or the fourth access level, transmit information requesting permission for change in the access level to the unmanned vehicle management device 12, and receive a message indicating whether the request is permitted or not from the unmanned vehicle management device 12.

Meanwhile, the unmanned vehicle management device 12 may generate movement instruction information and transmit the information to the unmanned vehicle 11.

For example, the unmanned vehicle management device 12 can communicate with the control server device 13 in a wired or wireless manner. Thus, the unmanned vehicle management device 12 can receive the movement instruction information from the control server device 13 and transmit the information to the unmanned vehicle 11. The movement instruction information transmitted from the control server device 13 may include movement position information indicating a target destination to which the unmanned vehicle 11 needs to move and movement route information indicating a route to the target destination.

Alternatively, the movement instruction information transmitted from the control server device 13 may include movement position information indicating the target destination to be reached by the unmanned vehicle 11. The unmanned vehicle management device 12 may locate the current position of the unmanned vehicle 11 and generate movement route information indicating a route from the current position to the target destination. Then, the unmanned vehicle management device 12 may generate the movement instruction information including the movement position information and the movement route information and transmit the movement instruction information to the unmanned vehicle 11.

Further alternatively, instead of receiving the movement instruction information from the control server device 13, the unmanned vehicle management device 12 may generate movement instruction information by itself and transmit the generated movement instruction information to the unmanned vehicle 11. Specifically, the unmanned vehicle management device 12 may include an input/output device (for example, a keypad, a display, a touch screen, etc.) having an interface via which the movement position information indicating the target destination can be input. The unmanned vehicle management device 12 may generate movement instruction information including movement position information input by a user.

In particular, the unmanned vehicle management device 12 according to one embodiment of the present disclosure may perform an operation of checking IoT device information on at least one IoT device 14 located at a position corresponding to the movement position information and an operation of checking the access right information indicating an access level with respect to at least one IoT device 14.

Specifically, the unmanned vehicle management device 12 may verify IoT device information on the at least one IoT device 14 located the position corresponding to the movement position information and transmit the 101 device information to the unmanned vehicle 11.

For example, the unmanned vehicle management device 12 may confirm the IoT device information on the at least one IoT device 14 by checking the mission information received from the control server device 13. That is, the control server device 13 may provide the IoT management device 15 with the movement position information. At this time, the control server device 13 may make a request for IoT device information on at least one IoT device 14 located at the position corresponding to the movement position information, receive the IoT device information on at least one IoT device 14 from the IoT management device 15, and transmit the received IoT device information to the unmanned vehicle management device 12.

Alternatively, the unmanned vehicle management device 12 may provide the IoT management device 15 with the movement position information. At this time, the unmanned vehicle management device 12 may make a request for IoT device information on at least one IoT device 14 located at the position corresponding to the movement position information, receive the IoT device information on the at least one IoT device 14 from the IoT management device 15, and check the IoT device information.

On the other hand, the unmanned vehicle management device 12 may receive access rights information with respect to at least one IoT device 14 along with the IoT device information from the IoT management device 15.

Alternatively, the unmanned vehicle management device 12 may receive a request for access right information from the unmanned vehicle 11 or receive a request for access right information through an input/output device of the unmanned vehicle management device 12. The unmanned vehicle management device 12 may receive the access right information with respect to at, least one IoT device 14 from the IoT management device 15 by making a request for the access right information. The manned vehicle management device 12 may transmit the access right information to the unmanned vehicle 11.

In addition, the unmanned vehicle management device 12 may receive the IoT collection information that is collected by at least one IoT device 14 from the unmanned vehicle 11, and store and manage the IoT collection information. Here, the IoT collection information may include an IoT device identifier representing the identity of at least one IoT device 14 and IoT data that is collected for provision by the at least one IoT device 14.

In addition, the unmanned vehicle management device 12 may receive IoT control information used to control at least one IoT device 14 from the unmanned vehicle 11 and transmit the IoT control information to the IoT management device 15. At this time, along with the IoT control information, the unmanned vehicle management device 12 may transmit a request for transmission of the IoT control information to at least one IoT device 14, to the IoT management device 15. Here, the IoT control information may include an IoT device identifier indicating the identity of at least one IoT device 14 and a control command for controlling the at least one IoT device 14.

On the other hand, the control server device 13 may be connected with the unmanned vehicle management device 12 and the IoT management device 15 in a wired/wireless communication manner and may store the data provided by the unmanned vehicle management device 12 and the IoT management device 15. The control server device 13 may be provided between the unmanned vehicle management device 12 and the IoT management device 15, thereby being capable of relaying data between the unmanned vehicle management device 12 and the IoT management device 15.

Specifically, the control server device 13 may include an input/output device (e.g., a keypad, a display, a touch screen, and the like), and may provide an interface via which the control server device 13 can receive the movement position information that is input by a user and which indicates the position to which the unmanned vehicle 11 needs to be moved. The control server device 13 may generate the movement instruction information containing movement position information input by a user.

In addition, the control server device 13 may provide an interface to a user by means of the input/output device (for example, a keypad, a display, a touch screen, and the like), thereby receiving mission execution information regarding a is mission to be performed by the unmanned vehicle 11 from a user or receiving a transmission command for transmitting the mission information to the unmanned vehicle 11 (or the unmanned vehicle management device 12).

When the mission information input, the control server device 13 may make a request to the IoT management device 15 for the IoT device information of at least one IoT device 14 located at the position corresponding to the movement position information. The control server device 13 may also make a request for the access right information with respect to the at least one IoT device 14.

The control server device 13 may also receive verification request for the validity of the unmanned vehicle 11 from the IoT management device 15, verify the of the unmanned vehicle 11 on the basis of the identification information on the unmanned vehicle 11, and provide a verification result. For example, the control server device 13 may store and manage transmission history of the mission information when transmitting the mission information to the unmanned vehicle 11 and may perform a verification process on the unmanned vehicle 11 using the transmission history of the mission information.

The IoT management device 15 manages the IoT device information of at least one IoT device 14 and receives, stores, and manages the IoT collection information provided by the at least one IoT device 14.

In particular, the IoT management device 15 may manage IoT position information indicating the positions where the IoT devices 14 are installed. When the IoT management device 15 is requested to provide the IoT device information on an IoT device located at the position corresponding to the movement position information from the control server device or the unmanned vehicle management device 12, the IoT management device 15 may detect at least one IoT device 14 in the vicinity of the position corresponding to the movement position information by using the IoT position information. Then, the IoT management device 15 may provide the IoT device information on at least one IoT device 14 which is detected to the control server device 13 or the unmanned vehicle management device 12.

The IoT management device 15 may receive the access right information with respect to at least one IoT device 14 from the unmanned vehicle management device 12, search for the access right information with respect to the at least one IoT device 14 and provides the found access right information at the request.

Further, when the IoT management device 15 may provide the access right information, the IoT management device 15 may perform a verification process on the validity of the unmanned mobile device 12 or the unmanned mobile device 11 which has requested the access right information. For example, the IoT management device 15 may request the control server device 13 to verify the validity of the unmanned vehicle management device 12 or the unmanned vehicle 11 that has requested the access right information and receive the verification result from the control server device 13.

The IoT management device 15 may be requested by the unmanned vehicle management device 12 or the unmanned vehicle 11 to change the access level with respect to at least one IoT device 14, provide a permission or non-permission for the change.

Alternatively, the IoT management device 15 may receive IoT control information for controlling at least one IoT device 14 from the unmanned vehicle management device 12 or the unmanned vehicle 11 and may perform a control operation of controlling the at least one IoT device 14.

Hereinafter, the operation of an unmanned vehicle operation system according to various embodiments of the present disclosure will be described with reference to FIG. 9 and the other accompanying drawings.

FIG. 11 is a diagram illustrating a signal flow during the operation of the unmanned vehicle operation system according to one embodiment of the present disclosure.

Firstly, in Step S1101, a control server device 13 may recognize that there is an event in which an unmanned vehicle needs to be dispatched. For example, the control server device 13 may receive movement position information indicating a target destination to be reached by the unmanned vehicle 11 and mission execution information indicating a mission to be performed by the unmanned vehicle 11 via an input/output device (for example, a keypad, a display, a touch screen) from a Next, the control server device 13 may be requested via the input/output device by the user to transmit mission information to the unmanned vehicle 11 or an unmanned vehicle management device 12.

Next, in Step S1102, the control server device 13 may request an IoT management device 15 to transmit IoT device information on at least one IoT device 14 located at the target position to be reached by the unmanned vehicle 11 thereto. In Step S1103, the control server device 13 may receive the IoT device information on the at least one IoT device 14 from the IoT management device 15.

Next, in Step S1106, the control server device 13 may generate the mission information and transmit the mission information to the unmanned vehicle management device 12. The mission information may include movement instruction information indicating the target destination to be reached by the unmanned vehicle 11, and mission execution information indicating a mission to be performed by the unmanned vehicle 11. The mission information may further include IoT device information on at least one IoT device 14. The IoT device information may be contained in the movement instruction information or the mission execution information or may be provided as independent information separated from the movement instruction information or the mission execution information.

In Step S1104, the control server device 13 may further request the IoT management device 15 to provide access right information indicating an access level with respect to the at least one IoT device 14. In Step S1105, the IoT management device 15 may check the access level with respect to the at least one IoT device 14 and provide the control server device 13 with the access right information indicating the access level.

The control server device 13 may provide the unmanned vehicle management device 12 with the access right information with respect to at least one IoT device 14. At this time, the control server device 13 may transmit the access right information with respect to at least one IoT device 14 in the form of a piece of information contained in the mission information or may transmit the access right information in the form of a discrete message separated from the mission information.

On the other hand, in Step S1107, the unmanned vehicle management device 12 may check the mission information received from the control server device 13 and transmit the mission information to the unmanned vehicle 11. Here, the unmanned vehicle management device 12 may check the movement position information contained in the movement instruction information of the mission information and check the movement route information indicating the route from the current position to the target destination of the unmanned vehicle 11. Next, the unmanned vehicle management device 12 may transmit the movement route information in the form of information contained in the movement instruction information. Here, the movement route information may include way point information including at least one way point on the way to the target destination. The way point information may include coordinate information including a longitude coordinate and a latitude coordinate and altitude information.

In Step S1108, upon receiving the mission information, the unmanned vehicle 11 may transmit a response message indicating that the mission information has been received to the unmanned vehicle management device 12. In Step S1109, the unmanned vehicle management device 12 may transmit information notifying that the unmanned vehicle 11 has departed to the control server device 13.

The unmanned vehicle 11 may be equipped with a positioning device (for example, a GPS receiver module) with which the unmanned vehicle 11 can confirm the current position. Thus, in Step S1110, the unmanned vehicle 11 may routinely check and monitor the current position where the unmanned vehicle 11 is located and generate a control signal guiding the unmanned vehicle 11 to at least one way point on the way to the target destination. Accordingly, the unmanned vehicle 11 can move to the target position indicated by the movement position information via the way points.

In addition, the unmanned vehicle 11 may check the mission execution information contained in the mission information and the for IoT device information. The unmanned vehicle 11 can process an operation of making a communication connection to at least one IoT device 14, a mission execution operation instructed by the mission execution information, or the like. The operation of connecting with the IoT device 14 and the mission execution operation instructed by the mission instruction information will be described in detail below when describing the process of S1111 to S1123.

Further, the unmanned vehicle 11 may perform operations based on the access right information with respect to the IoT device 14 at the time of performing the operations such as connecting with the IoT device 11 or executing mission instructed by the mission execution information. For this purpose, the unmanned vehicle 11 may perform an operation of checking the access right information with respect to the IoT device 14.

When the access right information with respect to the IoT device 14 is contained in the mission information, the unmanned vehicle 11 may confirm the access right information with respect to the IoT device 14 by detecting the access right information contained in the mission information.

Alternatively, in Step S1111 and Step S1112, when the access right information with respect to the IoT device 14 is not contained in the mission information, the unmanned vehicle 11 may request the IoT management device 15 to provide the access right information with respect to the at least one IoT device 14 via the unmanned vehicle management device 12. For example, when the unmanned vehicle 11 detects a device considered as an IoT device 14 in a mission area, an auxiliary communication unit 66 built in the unmanned vehicle 11 may identify and verify the IoT device 14 by performing a device discovery procedure according to an IoT communication protocol. When the IoT communication protocol does not specify the device discovery procedure, the unmanned vehicle 11 may make a request to the IoT management device 15 for provision of the access right information with respect to the IoT device 14, using position information of the unmanned vehicle 11 and IoT device type information obtained through image recognition.

In response to this, the IoT management device 15 may request the control server device 13 to verify the validity of the unmanned vehicle 11 or the unmanned vehicle management device 12. In this case, the control server device 13 performs a verification process on the unmanned vehicle 11 or the unmanned vehicle management device 12 and provide the verification result to the IoT management device 15 in Step S1113 and Step S1114.

In Step S1115 and Step S1116, when the verification result reveals that the unmanned vehicle 11 or the unmanned vehicle management device 12 is a valid device, the IoT management device 15 may provide the access right information with respect to the at leas t one IoT device to the unmanned vehicle 11 via the unmanned vehicle management device 12.

When the unmanned vehicle 11 has moved to the target destination corresponding to the movement position information along the preset route including at, least one way point in Step S1117, the unmanned vehicle 11 may perform a communication connection with at least one IoT device 14 in Step S1118.

In Step S1119 and Step S1120, the unmanned vehicle 11 may request data (IoT collection information) from at least one IoT device on the basis of the access right information with respect to the at least one IoT device 14 and receive the result from the at least one IoT device 14. In Step S1121, the unmanned vehicle 11 may provide the data received from the at least one IoT device 14 to the unmanned vehicle management device 12.

In Step S1122, the unmanned vehicle 11 may perform the mission execution operation instructed by the mission instruction information.

The mission execution operation may be an operation of processing various types of data received from the IoT device 14, an operation of checking data related to the mission information, and an operation of performing the mission using the data.

For example, the unmanned vehicle 11 may search for a target type of data required for a mission execution among many types of data received from the IoT device 14 and remove data irrelevant to the mission execution. Then, the unmanned vehicle 11 performs an operation of converting data that is difficult to directly use as it is for mission execution, out of the data required for the mission execution, into a suitable form of data. Meanwhile, when the collected data cannot be directly used for mission execution, and when it is necessary to extract information necessary for the mission execution through analysis of multiple set of data, the unmanned vehicle 11 may perform data analysis and extract (or estimate) required information.

The operation of the unmanned vehicle 11 to select data related to mission execution among the various types of data received from the IoT devices 14 according to the mission type, or to extract the data through data conversion may be performed using artificial intelligence (AI) technology based on simulations and data resulting from a previous mission execution.

For example, the unmanned vehicle 11 may be configured to self-learn through deep-learning technology that which type of data needs to be selected from various types of data received from the IoT devices in a specific mission environment condition or how the selected data needs to be converted to increase the possibility of successful mission execution. The learned method may be used when the unmanned vehicle 11 performs an actual mission. In the case of applying machine learning to the unmanned vehicle 11, the unmanned vehicle 11 can continuously improve the mission success rate through the use of previous data by continuously reflecting the information that is generated each tame that the unmanned vehicle 11 performs a mission.

For example, there may be a case where the unmanned vehicle 11 performs a fire extinguishing task in a fire occurrence area. In this case, the unmanned vehicle 11 may collect information provided by a temperature sensor corresponding to an IoT device, as data related to execution of the mission. Based on the information provided by the temperature sensor corresponding to the IoT device, it is Possible to obtain and check data related to the mission information, for example, fire position, direction of the fire, etc.

As another example, the unmanned vehicle 11 may collect information provided by a motion sensor corresponding to an IoT device. Based on the information provided by the motion sensor corresponding to the IoT device, it is possible to obtain and check data related to the mission information, that is, information of whether there is a person in the vicinity, whether the person exists, or the like.

As a further example, the operation of the unmanned mobile unit 11 to select or convert any piece of data among many pieces of data provided by the IoT device 14 can be controlled by the unmanned vehicle management device 12. The unmanned vehicle management device 12 may receive a specific work command as the mission to be performed by the unmanned vehicle 11 from a manager, and then transmit the specific work command to the unmanned vehicle 11. As a further example, the unmanned vehicle management device 12 may check various types of data received from multiple IoT devices 14 and may setup the operation of selecting a type of data related to mission from among the various types of data or extracting that data through data conversion through machine learning based on simulations and previous mission execution data.

In Step S1123, the unmanned vehicle 11 may transmit IoT control information for controlling at least one IoT device to the at least one IoT device 14, according to the mission information and the access right information with respect to the at least one IoT device 14.

The IoT control information may be generated using AI techniques such as machine learning and the like based on simulations and previous mission execution data.

There will be presented an example below in which the IoT device 14 is a lighting device and a mission in the mission information is an image recognition operation or an image analysis operation. In this case, the unmanned vehicle 11 may check an illumination level in a mission area. When the checking results reveal that the illumination level is too low to perform image recognition or analysis, the unmanned vehicle 11 may generate IoT control information for controlling the lighting device to raise the illumination level. The IoT control information for controlling the illumination level can be determined by learning in advance through a machine learning method. Thus, a method of maximizing the success rate of mission by using various IoT devices existing in the mission execution environment can be determined.

As another example, the IoT control information may be generated by the unmanned vehicle management device 12 through machine learning.

FIG. 12 is a diagram illustrating a signal flow during operation of an unmanned vehicle operation system according to a second embodiment of the present disclosure.

The operation of the unmanned vehicle operation system according to the second embodiment of the present disclosure is similar to that of the unmanned vehicle operation system according to the first embodiment of the present disclosure which have been described above with reference to FIG. 11. That is, regarding the operation of the unmanned vehicle operation system according to the second embodiment of the present disclosure, S1101 to S1120 will be referred to for understanding of S1201 to S1220.

However, S1221 to S1224 in the operation of the unmanned vehicle operation system according to the second embodiment of the present disclosure may differ respectively from S1221 to S1224 in the operation of the unmanned vehicle operation system according to the first embodiment of the present disclosure described above. Hereinafter, the process of S1221 to S1224 in the operation of the unmanned vehicle operation system according to the second embodiment will be described.

First, in Step S1221, the unmanned vehicle 11 may check the mission information received from the unmanned vehicle management device 12 and perform the mission instructed by the mission information.

While the mission is being performed by the unmanned vehicle 11, the unmanned vehicle 11 may generate the IoT control information for controlling the IoT device 14 and transmit the IoT control information to the IoT device 14 when an occasion in which it is necessary to control the IoT device 14 occurs. At this time, the unmanned vehicle 11 may check the access right information with respect to at least one IoT device 14 and perform generation and transmission of the IoT control information while taking into the access right information into account. Specifically, for example, when an unmanned vehicle has a first access level or a second access level, the unmanned vehicle can collect data from the IoT device but cannot control the operation of the IoT device 14. Accordingly, when the access right information with respect to the at least one IoT device 14 indicates the first level or the second level and when the mission of the unmanned vehicle is an operation requiring controlling the operation of the IoT device 14, in Step S1222, the unmanned vehicle 11 may request the IoT management device 15 to change the access level via the unmanned vehicle management device 12. In this case, in Step S1223, the IoT management device 15 may notify the unmanned vehicle 11 of permission or non-permission for the change in the access level via the unmanned vehicle management device 12.

When the IoT management device 15 permits the change in the access level in Step S1224, the unmanned vehicle 11 may generate IoT control information required for performing the mission and may transmit the IoT control information to the at least one IoT device 14.

FIG. 13 is a diagram illustrating a signal flow during operation of an unmanned vehicle operation system according to a third embodiment of the present disclosure.

The operation of the unmanned vehicle operation system according to the third embodiment of the present disclosure is similar to that of the unmanned vehicle operation system according to the first embodiment of the present disclosure which have been described above with reference to FIG. 11. That is, regarding the operation of the unmanned vehicle operation system according to the third embodiment of the present disclosure, the process of S1301 to S1320 may be the same as the process of S1101 to S1120 described above. Therefore, S1101 to S1120 may be referred for understanding of S1301 to S1320.

However, S1321 to S1324 in the operation of the unmanned vehicle operation system according to the third embodiment of the present disclosure may differ from those of the first embodiment described above. Hereinafter, the process of S1321 to S1324 in the operation of the unmanned vehicle operation system according to the third embodiment will be described.

First, in Step S1321, the unmanned vehicle 11 may check the mission information received from the unmanned vehicle management device 12 and perform the mission as instructed by the mission information.

When it is required to control the operation of the IoT device 11 during a process in which the unmanned vehicle 11 performs the mission, the unmanned vehicle 11 may generate the IoT control information for controlling the operation of the IoT device 14 and transmit the IoT control information to the IoT device 14. At this time, the unmanned vehicle 11 may perform generation and transmission of the IoT control information by taking the access right information with respect to the IoT device 14 into account.

Specifically, for example, the first access level or the second access level denotes that the unmanned vehicle can collect data from the IoT device 14 but cannot control the operation of the IoT device 14. Accordingly, when the access right information with respect to a certain IoT device 14 indicates the first access level or the second access level and when in this state the unmanned vehicle is commanded to perform a mission which requires controlling the operation of the IoT device 14, in Step S1322, the unmanned vehicle 11 may transmit IoT control information with respect to the IoT device 14 to the IoT management device 15 via the unmanned vehicle management device 12.

In this case, in Step S1323, the IoT management device 15 may notify the unmanned vehicle 11 that the IoT management device 15 has received the IoT control information via the unmanned vehicle management device 12. In Step S1324, the IoT management device 15 may transmit IoT control information required to carry out the mission to at least one IoT device 14.

FIG. 14 is a block diagram illustrating the configuration of an unmanned vehicle according to one embodiment of the present disclosure.

The unmanned vehicle according to one embodiment of the present disclosure may include a mission control unit 61, an operation control unit 62, a mission execution processing unit 63, an IoT device control unit 64, a main communication unit 65, and an auxiliary communication unit 66.

The mission control unit 61 can communicate with an unmanned vehicle management device using the main communication unit 65 and can check the information received from the unmanned vehicle management device. For example, the mission control unit 61 may receive mission information from the unmanned vehicle management device and check movement instruction information and mission execution information included in the mission information. The mission control unit 61 may transmit the movement instruction information to the operation control unit 62, check the mission execution information, and process an operation corresponding to the mission execution information. Specifically, when the operation specified in the mission execution information is an operation involving the mission execution processing unit 63, the mission control unit 61 may provide the mission execution processing unit 63 with mission execution control information for controlling the mission execution processing unit 63. Meanwhile, when the operation specified in the mission execution information requires collection of data obtained by the IoT device or control of the IoT device, the IoT device control information instructing the collection or the control may be provided to the IoT device control unit 64.

Furthermore, the mission control unit 61 may check the access right information with respect to the IoT device among various pieces of information provided by the unmanned vehicle management device. The access right information may be signaled as being contained in the mission information or signaled as independent information.

As another example, when the control of the IoT device is required, the mission control unit 61 requests the IoT management device, via the unmanned vehicle management device, to provide access right information including an access level required for the control of the IoT device thereto, receive the response (i.e., permission or non-permission) to the request from with the IoT management device, and confirm the access right information with respect to the IoT device.

As a further example, the mission control unit 61 may request the IoT management device, via the unmanned vehicle management device, to provide thereto the access right information including the access level allowed by the IoT device and receive a response to the request. Through this operation, the mission control unit 61 can confirm the access level allowed by the IoT device.

When the control of the IoT device is required in a state in which the access level allowed by the IoT device is at a level that does not permit the control of the IoT device, the mission control unit 61 may transmit the IoT device control information to the IoT management device.

The operation control unit 62 may be equipped with a positioning device (for example, a GPS receiver module) with which LT current position of the unmanned vehicle can be located and confirmed. The operation control unit 62 may generate a control signal guiding the unmanned vehicle 11 to at least one way point while monitoring the current position of the unmanned vehicle using the positioning device. The operation control unit 62 may include at least one rotary motor, at least one rotor respectively combined with the at least one rotary motor, and a motion sensor for detecting motion of the body of the unmanned vehicle. Based on this, the operation control unit 62 may generate a drive control signal controlling the unmanned vehicle 11 to move to the predetermined way point by driving the at least one rotary motor and generate a position control signal for controlling the unmanned vehicle 11 to maintain a stable position while moving to the way point using motion information detected by the motion sensor.

When the unmanned vehicle has reached the target destination, the operation control unit 62 may provide information indicating the successful arrival to the mission control unit 61, and the mission control unit 61 may provide this information to the unmanned vehicle management device or the control server device.

The operation control unit 62 may provide current position information indicating the current position of the unmanned vehicle to the mission control unit 61 at predetermined time intervals, and the mission control unit 61 may provide this information to the unmanned vehicle management device or the control server device.

When confirming the arrival of the unmanned vehicle at the target position, the mission control unit 61 may cause the IoT device control unit 64 to make a connection with the at least one IoT device using the IoT device information on the at least one IoT device located in the vicinity of the target destination.

The mission instruction information provided by the unmanned vehicle management device may include IoT identification information indicating the identity of the IoT device. The mission control unit 61 may identify at least one IoT device using the IoT identification information. The mission control unit 61 may send a message requesting connection with an IoT device along with IoT identification information on the IoT device to the IoT device control unit 64. Then, the IoT device control unit 64 may perform an operation of connecting with at least one IoT device using the auxiliary communication unit 66. The auxiliary communication unit 66 may perform connection with at least one IoT device based on a communication scheme of ZigBee, LPWA, NBIoT, Bluetooth Low Energy, WiFi Direct, or the like.

The IoT device control unit 64 may transmit IoT data received from the at least one IoT device to the mission control unit 61. Upon receiving the IoT data, the mission control unit 61 may use the IoT data to process a mission execution operation or provide the IoT data to the unmanned vehicle management device or the control server device.

When the mission execution operation requires controlling the IoT device, the IoT device control unit 64 may receive the IoT device control information from the mission control unit 61 and transmit the IoT device control information to the corresponding IoT device. In this way, the control of the IoT device can be performed.

FIG. 15 is a block diagram illustrating devices provided in an unmanned vehicle operation system according to one embodiment of the present disclosure and a computing system for executing an unmanned vehicle operation method.

Referring to FIG. 15, a computing system 1010 includes at least one processor 1100, a memory device 1300, a user interface input device 1400, a user interface output device 1510, a storage device 1600, and a network interface device 1700 which are connected via buses 1200.

The processor 1100 may be a central processing unit (CPU) or a semiconductor device for executing commands stored in the memory device 1300 and/or the storage device 1600. Examples of the memory device 1300 and the storage device 1600 may include various types of volatile or non-volatile storage media. For example, the memory devices 1300 may include a read only memory (ROM) and a random access memory (RAM).

Accordingly, the steps or each of the methods or algorithms, which have been described in association with the embodiments disclosed in the present specification, may be embodied in hardware so as to be executed by the processor 1101, as a software module, or a combination of hardware and a software module. The software module may reside in a storage medium (e.g., the memory device 1300 and/or the storage device 1600) such as a RAM, a flash memory, a ROM, an EPROM, an EEPROM, a register, a hard disk, a removable disk, a CD-ROM, or the like. An exemplary storage medium may be coupled to the processor 1100 which is capable of reading information from and writing information to the storage medium. Alternatively, the storage medium may be merged with the processor 1100. The processor and the storage medium may be built in an application specific integrated circuit (ASIC). The ASIC may be built in a user terminal. Alternatively, the processor and the storage medium may be provided as discrete components and installed in a user terminal.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-executable instructions so that the software or instructions can be executed in an apparatus or on a computer.

What is claimed is:

1. A method of operating a terminal controlling system, the method comprising:

detecting, by a first terminal, a second terminal and producing detection result information;

transmitting, by the first terminal, the detection result information to a first control device controlling the first terminal;

making a request, by the first control device, to a server device for information on the second terminal;

making a request, by the first control device, to a second control device controlling the second terminal for inter-terminal interworking, using the information on the second terminal received from the server device;

receiving a response, by the first control device, to the inter-terminal interworking request from the second control device; and communicating by the first terminal, with the second terminal based on the response received from the control device.

2. The method according to claim 1, wherein the detecting the second terminal by the first terminal comprises exchanging of identification information between the first terminal and the second terminal when a common channel for a vehicle-to-vehicle (V2V) connection for the first terminal and the second terminal is specified in a V2V communication standard.

3. The method according to claim 1, wherein the detection result information includes at least one piece of information selected from among information indicating presence or absence of the second terminal, information on the second terminal, position information of the second terminal, and image information of the second terminal.

4. The method according to claim 1, wherein the server device manages at least one piece of information selected from among setting information for a V2V connection between the first terminal and the second terminal, identification information on the first terminal and the second terminal, mission execution position information, a management entity, and a method of connecting the first control device and the second control device.

5. The method according to claim 1, wherein the receiving, by the first control device, the response to the inter-terminal interworking request from the second control device comprises:

making a request, by the second control device to the server device for information on the first terminal from the server device; and transmitting the response, by the second control device, to the inter-terminal interworking request to the first control device, based on the information on the first terminal transmitted from the server device.

6. The method according to claim 1, wherein the communicating with the second terminal by the first terminal comprises:

creating, by the first control device, a tunnel between the first control device and the second control device according to the received response when there is no V2V link for a direct connection between the first terminal and the second terminal; and communicating, by the first terminal, with the second terminal based on the tunnel connection between the first terminal and the second terminal.

7. The method according to claim 1, further comprising: performing, by the server device, an authentication process on the first control device or the second control device.

8. A terminal control system comprising:

first terminal configured to detect a second terminal and transmit detection result information resulting from the detection to a first control device; the first control device configured to control the first terminal; and a server device configured to provide information on the second terminal to the first control device, wherein the first control device makes an inter-terminal interworking request to a second control device configured to control the second terminal, using the information on the second terminal received from the server device, and receives a response to the inter-terminal interworking request, and the first terminal communicates with the second terminal based on the response received from the first control device.

9. The terminal control system according to claim 8, wherein the first terminal and the second terminal exchange own identification information with each other when a common channel for a vehicle-to-vehicle (V2V) connection for the first terminal and the second terminal is specified in a V2V communication standard.

10. The terminal control system according to claim 8, wherein the detection result information includes at least one piece of information selected from among information indicating presence or absence of the second terminal, identification information on the second terminal, position information of the second terminal, and image information of the second terminal.

11. The terminal control system according to claim 8, wherein the server device manages at least one piece of information selected from among setting information for a V2V connection between the first terminal and the second terminal, identification information on the first terminal and the second terminal, mission execution position information, a management entity, and a method of connecting the first control device and the second control device.

12. The terminal control system according to claim 8, wherein the second control device makes a request to the server device for information on the first terminal and responds to the inter-terminal interworking request, based on the information on the first terminal received from the server device.

13. The terminal control system according to claim 8, wherein the first control device creates a tunnel between the first control device and the second control device according to the received response when there is no V2V link for a direct connection between the first terminal and the second terminal; and wherein the first terminal communicates with the second terminal based on the, tunnel connection.

14. The terminal control system according to claim 8, wherein the server device is a terminal control system performing an authentication process on the first control device and the second control device.

* * * * *

UNITED STATES PATENT AND TRADEMARK OFFICE
CERTIFICATE OF CORRECTION

| | | |
|---|---|---|
| PATENT NO. | : 10,834,766 B2 | Page 1 of 1 |
| APPLICATION NO. | : 16/137122 | |
| DATED | : November 10, 2020 | |
| INVENTOR(S) | : Tae Chul Hong | |

It is certified that error appears in the above-identified patent and that said Letters Patent is hereby corrected as shown below:

On the Title Page

Item (72) Inventor:
Replace "Tae Chui HONG, Seoul (KR)" with --Tae Chul HONG, Seoul (KR)--

Signed and Sealed this
Twenty-ninth Day of December, 2020

Andrei Iancu
*Director of the United States Patent and Trademark Office*